(12) United States Patent
Tanaka et al.

(10) Patent No.: US 12,511,705 B2
(45) Date of Patent: Dec. 30, 2025

(54) IMAGE PROCESSING APPARATUS AND IMAGE PROCESSING METHOD

(71) Applicant: SONY SEMICONDUCTOR SOLUTIONS CORPORATION, Kanagawa (JP)

(72) Inventors: Masao Tanaka, Kanagawa (JP); Sinsuke Hishinuma, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 213 days.

(21) Appl. No.: 18/256,163

(22) PCT Filed: Dec. 3, 2021

(86) PCT No.: PCT/JP2021/044418
§ 371 (c)(1),
(2) Date: Jun. 6, 2023

(87) PCT Pub. No.: WO2022/131017
PCT Pub. Date: Jun. 23, 2022

(65) Prior Publication Data
US 2024/0037696 A1  Feb. 1, 2024

(30) Foreign Application Priority Data
Dec. 17, 2020  (JP) ................. 2020-208912

(51) Int. Cl.
*G06T 1/60*  (2006.01)
*G06T 1/20*  (2006.01)

(52) U.S. Cl.
CPC . *G06T 1/60* (2013.01); *G06T 1/20* (2013.01)

(58) Field of Classification Search
CPC ... G06T 1/60; G06T 1/20; G06F 12/00; G06F 12/02
(Continued)

(56) References Cited

U.S. PATENT DOCUMENTS

| 5,104,245 | A | * | 4/1992 | Oguri | G06F 40/174 400/76 |
| 5,726,762 | A | * | 3/1998 | Akada | H04N 1/32358 358/401 |

(Continued)

FOREIGN PATENT DOCUMENTS

| JP | 2005117559 | * | 4/2005 | ............... G06T 1/60 |
| JP | 2007-172250 A | | 7/2007 | |
| JP | 2010-026915 A | | 2/2010 | |

OTHER PUBLICATIONS

Hayashi Mikihiro et al. Facsimile Equipment Feb. 14, 2003 Sharp KK JP2003046688 (A) paras. 1-44, Figs. 1-8 English.*

(Continued)

*Primary Examiner* — Prabodh M Dharia
(74) *Attorney, Agent, or Firm* — CHIP LAW GROUP

(57) ABSTRACT

The present invention relates to an image processing apparatus and an image processing method capable of reducing the capacity of a memory. Provided is an image processing apparatus including a memory that stores image data, and a control unit that controls write processing of writing the image data in the memory and read processing of reading the image data stored in the memory, in which the control unit frees a memory area where the image data is stored but is not read before the read processing is completed. For example, the present disclosure can be applied to an image processing apparatus that performs image stabilization processing or the like.

11 Claims, 22 Drawing Sheets

(58) Field of Classification Search
USPC .......................................................... 345/501
See application file for complete search history.

(56) References Cited

U.S. PATENT DOCUMENTS

| | | | | |
|---|---|---|---|---|
| 6,097,916 | A * | 8/2000 | Asai ..................... | B65H 45/18 |
| | | | | 358/448 |
| 6,496,277 | B1 * | 12/2002 | Chapin .............. | H04N 1/32358 |
| | | | | 358/1.16 |
| 2008/0250202 | A1 * | 10/2008 | Conley .............. | G06F 12/0866 |
| | | | | 711/E12.019 |
| 2020/0312369 | A1 * | 10/2020 | Hoshika ............... | G11B 27/031 |

OTHER PUBLICATIONS

Hayashi Mikihiro et al. Facsimile Equipment Feb. 14, 2003 Sharp KK JP2003046688 (A) paras. 1-44, Figs. 1-8 Japanese.*
International Search Report and Written Opinion of PCT Application No. PCT/JP2021/044418, issued on Jan. 18, 2022, 08 pages of ISRWO.

* cited by examiner

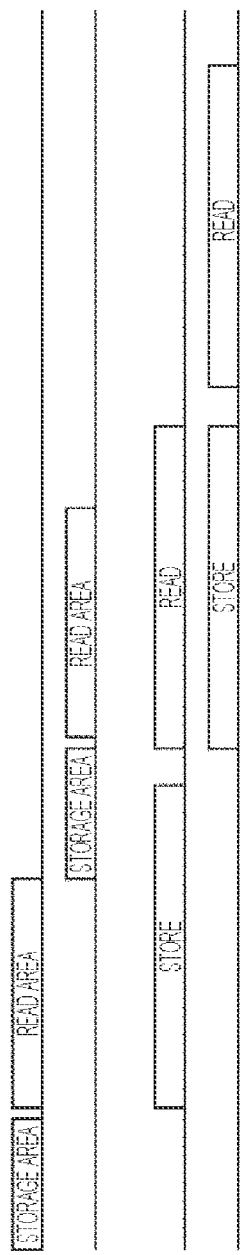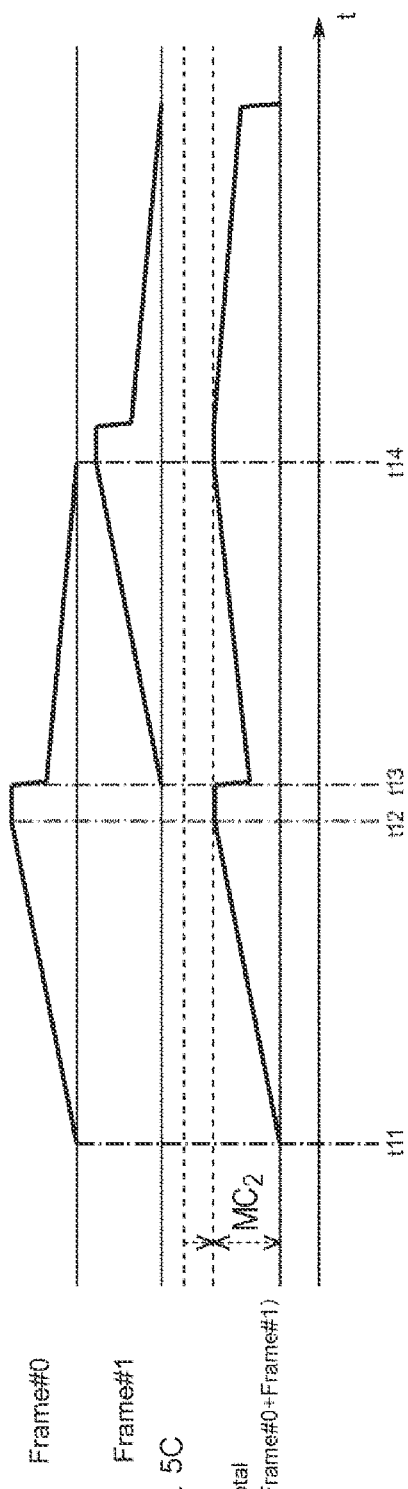

FIG. 7

| OUTPUT BLOCK NUMBER | REFERENCE DESTINATION COORDINATES |
|---|---|
| 0 | MVX,MVY |
| 1 | MVX,MVY |
| 2 | MVX,MVY |
| ⋮ | ⋮ |
| N | MVX,MVY |

181

| IMAGE AREA NUMBER | FREE TIMING |
|---|---|
| 0 | N0 |
| 1 | N1 |
| 2 | N2 |
| ⋮ | ⋮ |
| M | Nm |

182

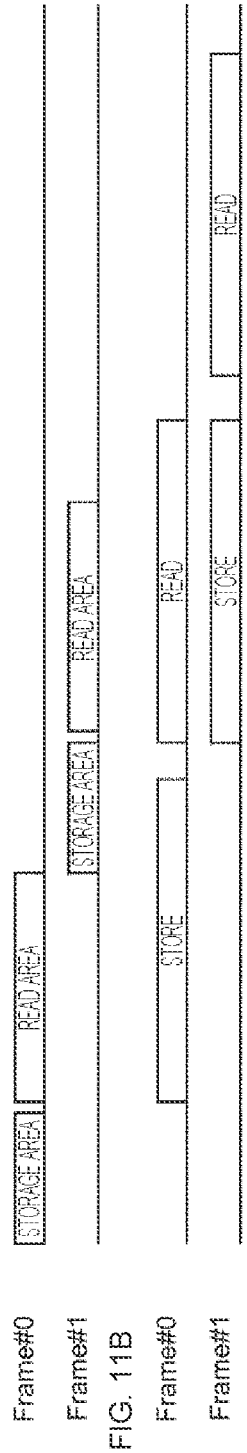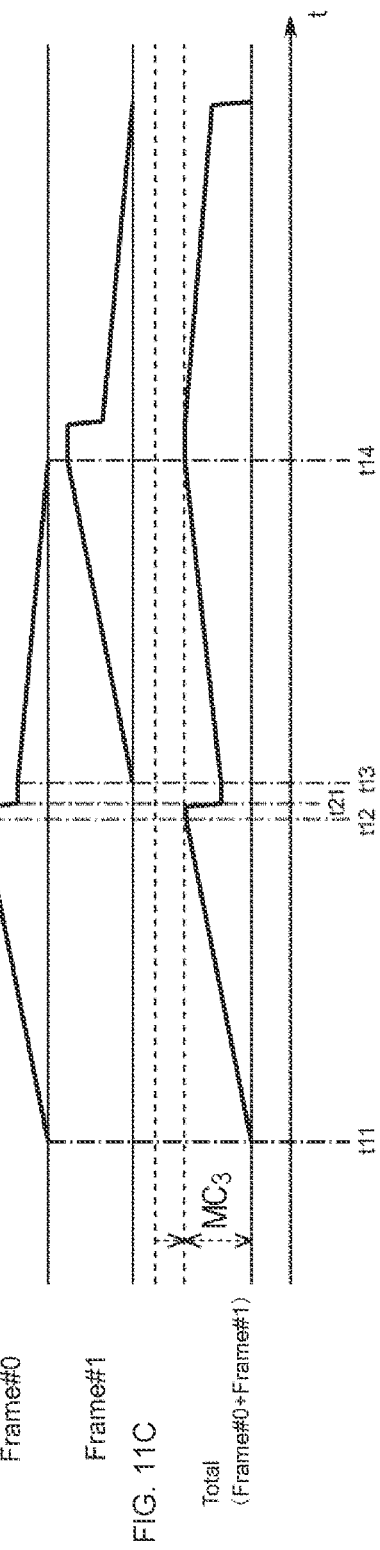

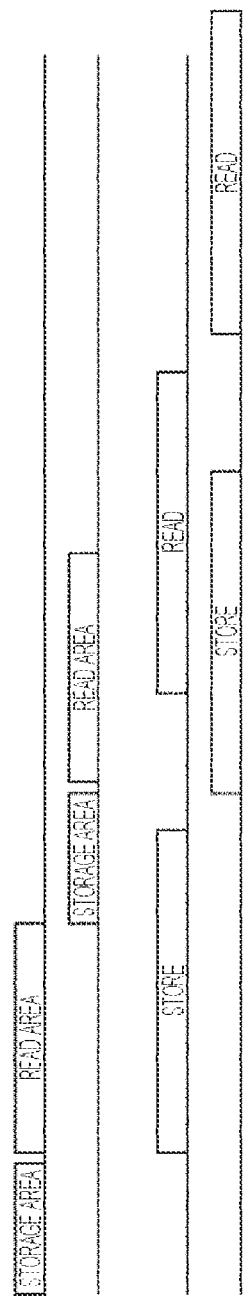
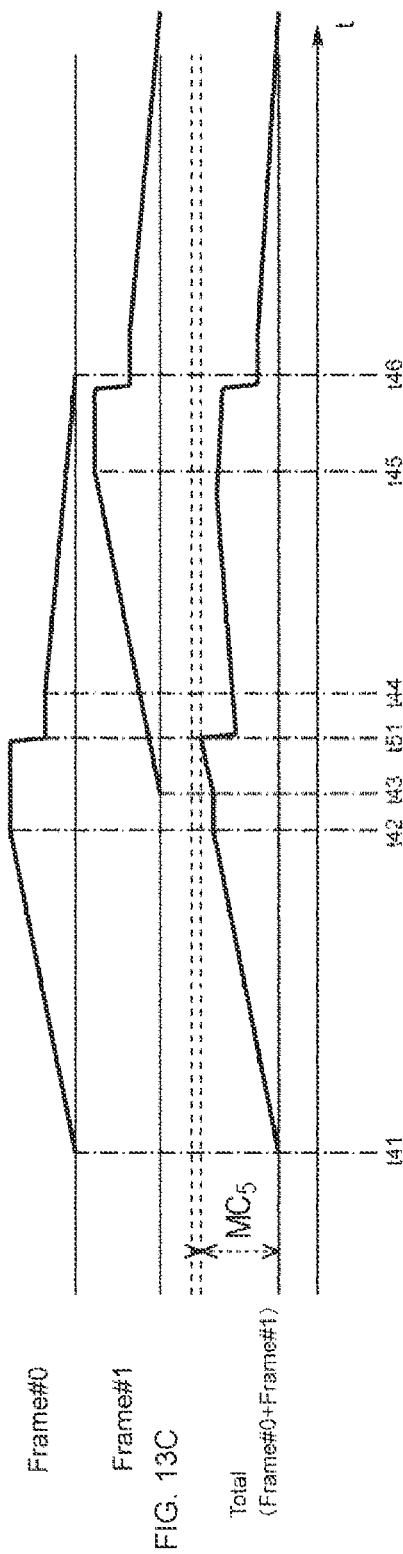
FIG. 13A
FIG. 13B
FIG. 13C

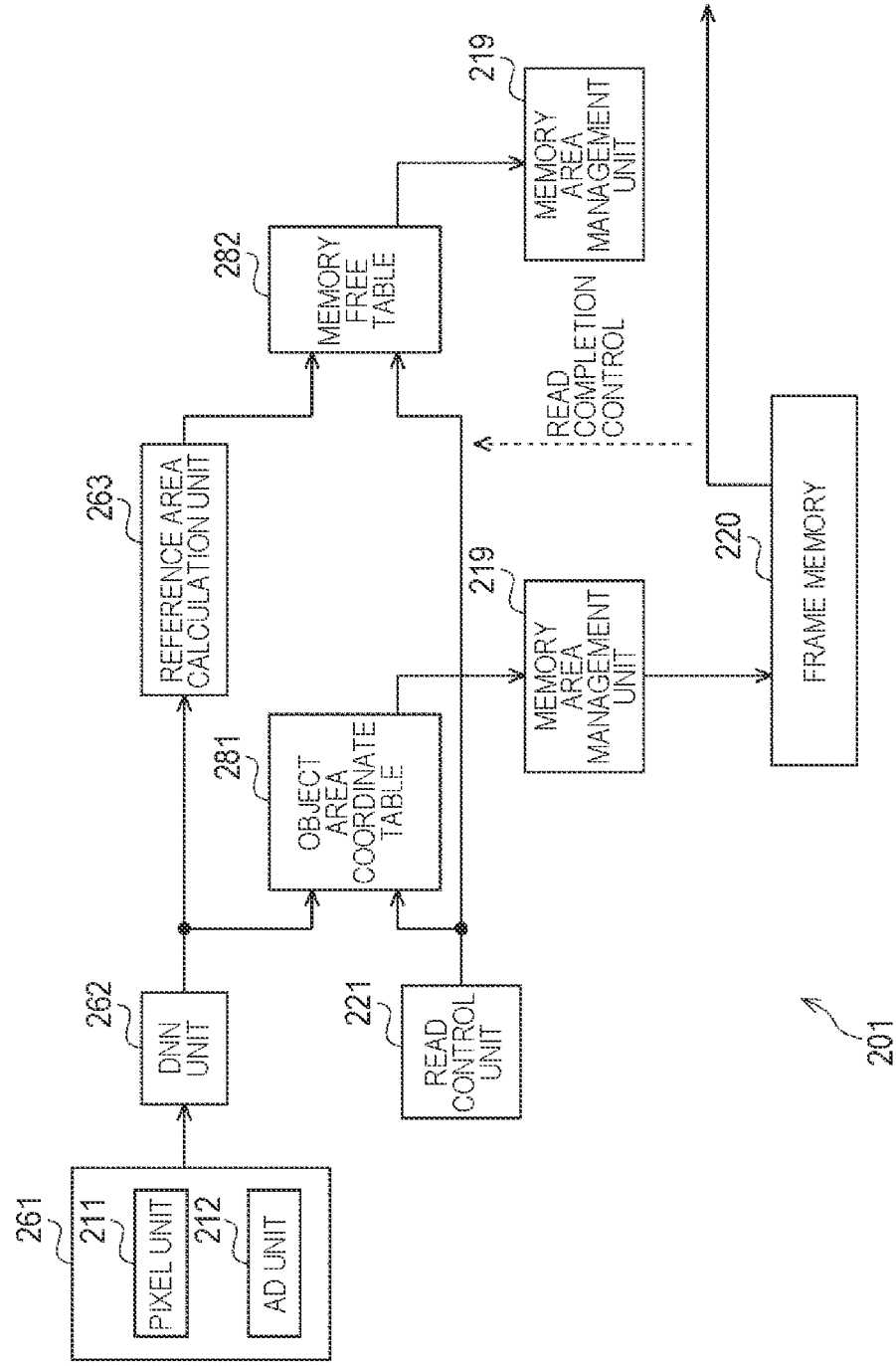

FIG. 17

| OBJECT NUMBER | RANGE COORDINATES |
|---|---|
| 0 | X0,Y0,X1,Y1 |
| 1 | X0,Y0,X1,Y1 |
| 2 | X0,Y0,X1,Y1 |
| ⋮ | ⋮ |
| N | X0,Y0,X1,Y1 |

281

| IMAGE AREA NUMBER | FREE TIMING |
|---|---|
| 0 | N0 |
| 1 | N1 |
| 2 | N2 |
| ⋮ | ⋮ |
| M | Nm |

282

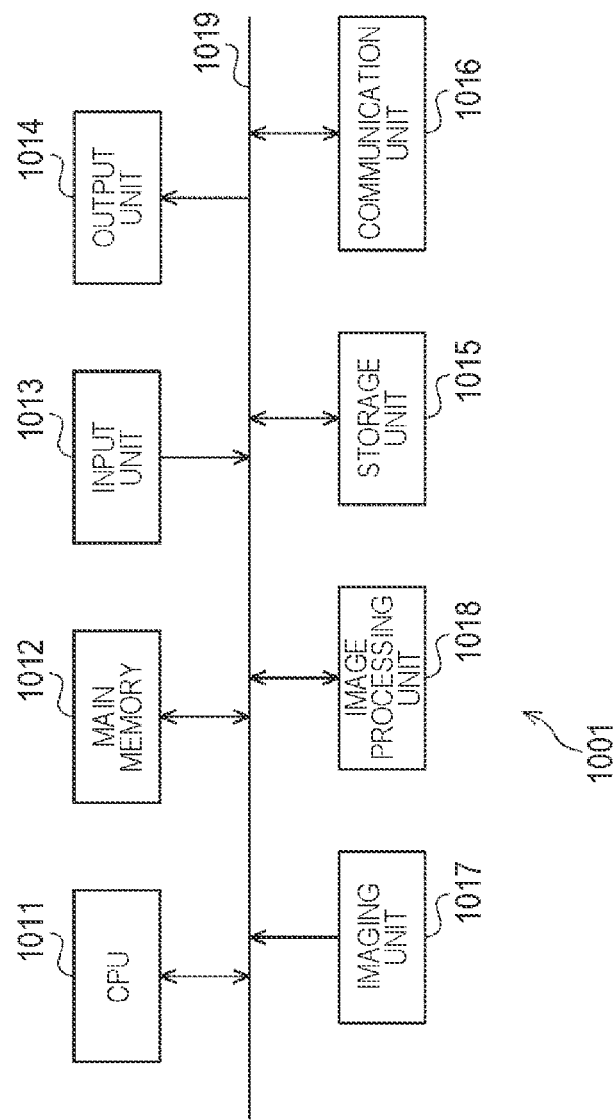

IMAGE PROCESSING APPARATUS AND IMAGE PROCESSING METHOD

CROSS REFERENCE TO RELATED APPLICATIONS

This application is a U.S. National Phase of International Patent Application No. PCT/JP2021/044418 filed on Dec. 3, 2021, which claims priority benefit of Japanese Patent Application No. JP 2020-208912 filed in the Japan Patent Office on Dec. 17, 2020. Each of the above-referenced applications is hereby incorporated herein by reference in its entirety.

TECHNICAL FIELD

The present invention relates to an image processing apparatus and an image processing method, particularly, to an image processing apparatus and an image processing method capable of reducing the capacity of a memory.

BACKGROUND ART

As a memory management method in an image processing apparatus, various management methods have been proposed. For example, Patent Document 1 discloses a technology in which, when data is read from a memory, information indicating usage thereof is updated to indicate that the data is used, and a memory area is freed, the memory area storing the data whose usage indicates that the data is used among data stored in the memory.

CITATION LIST

Patent Document

Patent Document 1: Japanese Patent Application Laid-Open No. 2010-026915

SUMMARY OF THE INVENTION

Problems to be Solved by the Invention

Meanwhile, in the image processing apparatus, when managing the memory, it is required to achieve a function with a smaller memory capacity and reduce the capacity of the memory. In the technology disclosed in Patent Document 1, although a memory area for which usage indicates used is freed, it is not sufficient for reducing the capacity of the memory.

The present disclosure has been made in view of such a situation, and an object thereof is to reduce the capacity of the memory.

Solutions to Problems

An image processing apparatus according to one aspect of the present disclosure is an image processing apparatus including a memory that stores image data, and a control unit that controls write processing of writing the image data in the memory and read processing of reading the image data stored in the memory, in which the control unit frees a memory area where the image data is stored but is not read before the read processing is completed.

An image processing method according to one aspect of the present disclosure is an image processing method in which, when write processing of writing image data in a memory and read processing of reading the image data stored in the memory are controlled, an image processing apparatus frees a memory area where the image data is stored but is not read before the read processing is completed.

In the image processing apparatus and the image processing method according to one aspect of the present disclosure, when write processing of writing image data in a memory and read processing of reading the image data stored in the memory are controlled, a memory area where the image data is stored but is not read is freed before the read processing is completed.

Note that the image processing apparatus according to one aspect of the present disclosure may be an independent apparatus or an internal block constituting one apparatus.

BRIEF DESCRIPTION OF DRAWINGS

FIGS. 5A, 5B, and 5C are timing charts representing, on a time axis, dynamic management of a memory in the image processing apparatus to which the present disclosure is applied.

FIG. 7 is a diagram illustrating an example of an MV table.

FIGS. 11A, 11B, and 11C are timing charts representing, on a time axis, dynamic management of a memory in a case where an invalid flag is used.

FIGS. 13A, 13B, and 13C are timing charts representing, on a time axis, dynamic management of a memory in a case where start of read processing is late.

FIG. 16 is a diagram for describing read processing and free processing in the image processing apparatus of FIG. 14.

FIG. 17 is a diagram illustrating an example of an object area coordinate table.

MODE FOR CARRYING OUT THE INVENTION (Way of Dynamic Management of Memory)

As a way of dynamic management of a memory in an image processing apparatus, there is a way in which a memory area is allocated when image data is stored, and the image data is read for processing and the memory area that has become unnecessary is freed. Furthermore, as a technology of memory management, garbage collection (GC) used for countermeasures against memory leakage is known.

Figure 1:
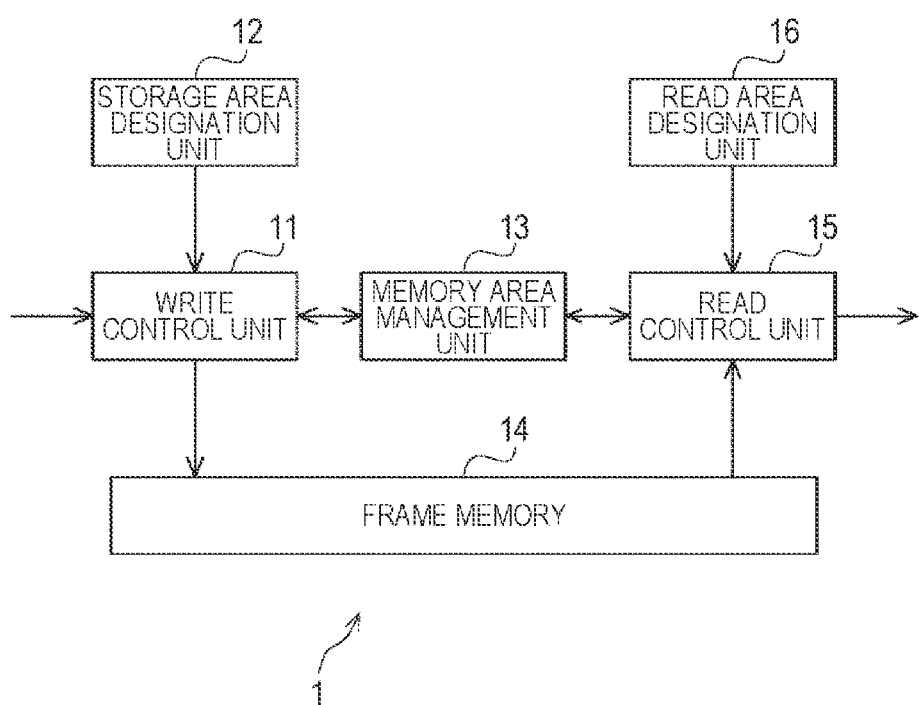
FIG. 1 is a diagram for describing dynamic management of a memory in an image processing apparatus.

FIG. 1 is a diagram for describing dynamic management of a memory in an image processing apparatus 1. In the image processing apparatus 1, a write control unit 11 writes image data of an input image frame (input image) in a frame memory 14 according to a storage area designated by a storage area designation unit 12. A memory area allocated when the image data is written in the frame memory 14 is managed by a memory area management unit 13.

Furthermore, in the image processing apparatus 1, a read control unit 15 reads the image data stored in the frame memory 14 according to a read area designated by a read area designation unit 16, and outputs the image data as an output image. The memory area for storing the image data is managed by the memory area management unit 13, and the memory area is freed after the image data is read.

In the storage area designation unit 12, a part or all of the area in the input image is designated as a storage area to be stored in the frame memory 14. In the read area designation unit 16, a part of the area in the input image stored in the frame memory 14 is designated as a read area to be read from the frame memory 14. That is, in the storage area, there is an area that does not become a read area (area that is not used).

Figure 2:
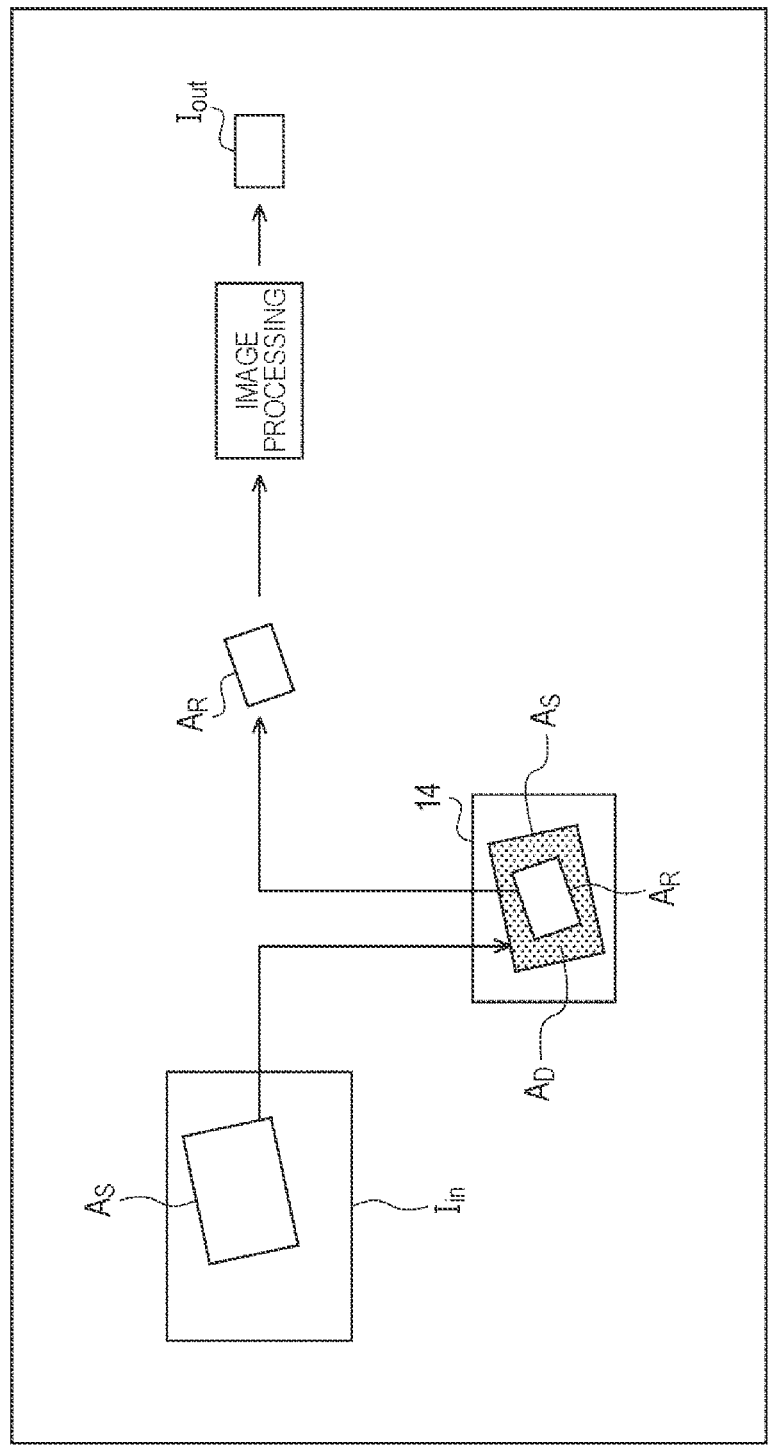
FIG. 2 is a diagram for describing a relationship between a storage area and a read area.

FIG. 2 illustrates a relationship between a storage area and a read area. In FIG. 2, a part of the entire area of an input image $I_{in}$ to be stored in the frame memory 14 is designated as a storage area $A_S$, and image data is stored in the frame memory 14 according to the storage area $A_S$. When the image data stored in the frame memory 14 is read, the image data is read according to a read area $A_R$.

The read area $A_R$ is an image area to be processed and is an area in the storage area $A_S$, and a difference between these areas is a difference area $A_D$. The difference area $A_D$ is represented by an area to which a dot pattern is applied in the drawing, and is an area of image data that has not been read from the frame memory 14 (image area not to be processed) in the area of image data (image area) stored in the frame memory 14. The image data read from the frame memory 14 is subjected to predetermined image processing and output as an output image $I_{out}$.

Figure 3:
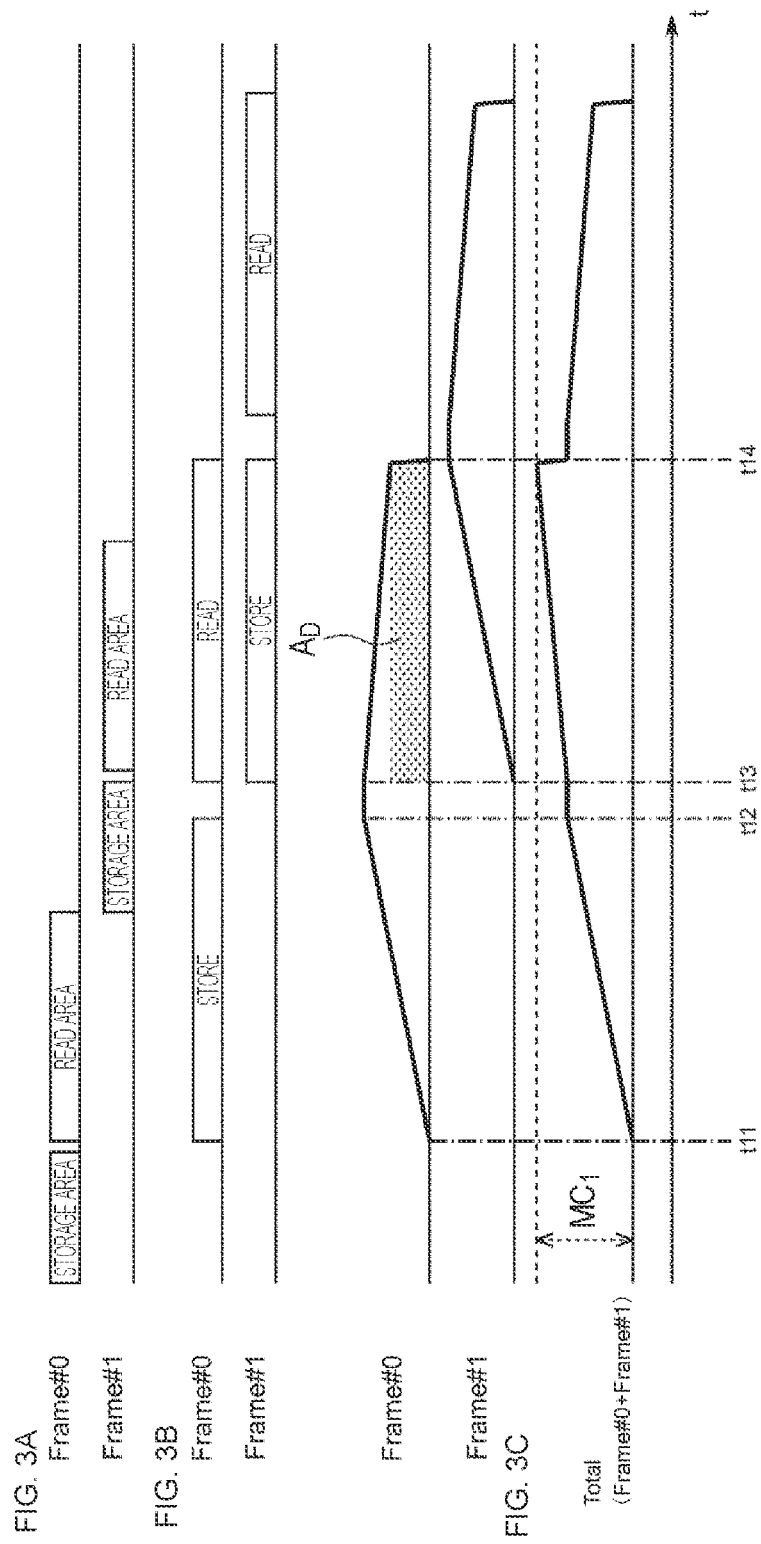
FIGS. 3A, 3B, and 3C are timing charts representing dynamic management of a memory in the image processing apparatus on a time axis.

FIGS. 3A, 3B, and 3C are timing charts representing dynamic management of a memory in the image processing apparatus 1 of FIG. 1 on a time axis. In FIGS. 3A, 3B, and 3C, direction of time is the direction from the left side to the right side in the drawing. The direction of time is similar in the timing charts of other drawings to be described later.

The timing chart of FIG. 3A represents algorithm processing for temporally consecutive image frames (Frame #0, Frame #1) on a time axis. In FIG. 3A, each of the storage area AS and the read area AR is calculated by sequentially performing algorithm processing for the image frame #0 and the image frame #1. Here, the storage area AS and the read area AR are calculated separately due to the circumstances of algorithm processing such as insufficiency of necessary data in terms of timing.

The timing chart of FIG. 3B represents input and output of image data to and from the frame memory 14 on a time axis. In FIG. 3B, image data corresponding to the storage area AS in the image frame #0 is stored in the frame memory 14 (time t11 to time t12), and image data corresponding to the read area AR is read from the image data stored in the frame memory 14 (time t13 to time t14). Furthermore, at the timing at which the image data corresponding to the read area AR in the previous image frame #0 is read, image data corresponding to the storage area AS in the subsequent image frame #1 is stored in the frame memory 14 (time t13 to time t14), and image data corresponding to the read area AR is read from the image data stored in the frame memory 14.

The timing chart of FIG. 3C represents the memory use amount of the frame memory 14 on a time axis. Focusing on the memory use amount by the image frame #0, a memory area is allocated when the image frame #0 is stored, and the memory use amount continues to increase from time t11 to time t12. Thereafter, at time t13, reading of the image frame #0 is started and the memory area from which the image frame #0 has been read is sequentially freed, and the memory use amount gradually decreases until the reading of the image frame #0 is completed at time t14.

Furthermore, at time t13, storage of the image frame #1 is started. Focusing on the memory use amount by the image frame #1, a memory area is allocated when the image frame #1 is stored in the frame memory 14, and the memory use amount continues to increase from time t13 to time t14. From time t13 to time t14, since the reading of the image frame #0 and the storage of the image frame #1 are performed at the same time, the total memory use amount by the image frame #0 and the image frame #1 continues to increase gently as compared with time t11 to time t12.

Here, focusing on the memory use amount by the image frame #0 at time 14, not all of the image data stored according to the storage area $A_S$ is read as the read area $A_R$, and the difference is the difference area $A_D$. The area to which a dot pattern is applied in the drawing corresponds to the memory use amount by the image data of the difference area $A_D$. Furthermore, at time 14, a memory area remaining without being freed in the frame memory 14 is freed using garbage collection. As a result, the memory area allocated to the image data of the image frame #0 is freed.

The memory capacity prepared in advance by the frame memory 14 is required to be set in accordance with the peak of the total memory use amount in order to store the image data of the image frame #0 and the image frame #1. In FIG. 3C, the memory capacity required to be prepared in advance by the frame memory 14 is memory capacity MC1 from the total memory use amount, but there is a demand for achieving a similar function with a smaller memory capacity. The present disclosure proposes a technology capable of reducing the capacity of a memory by achieving a function with a smaller memory capacity. Hereinafter, embodiments of the technology according to the present disclosure (the present technology) will be described.

1. First Embodiment

Configuration Example of Apparatus

Figure 4:
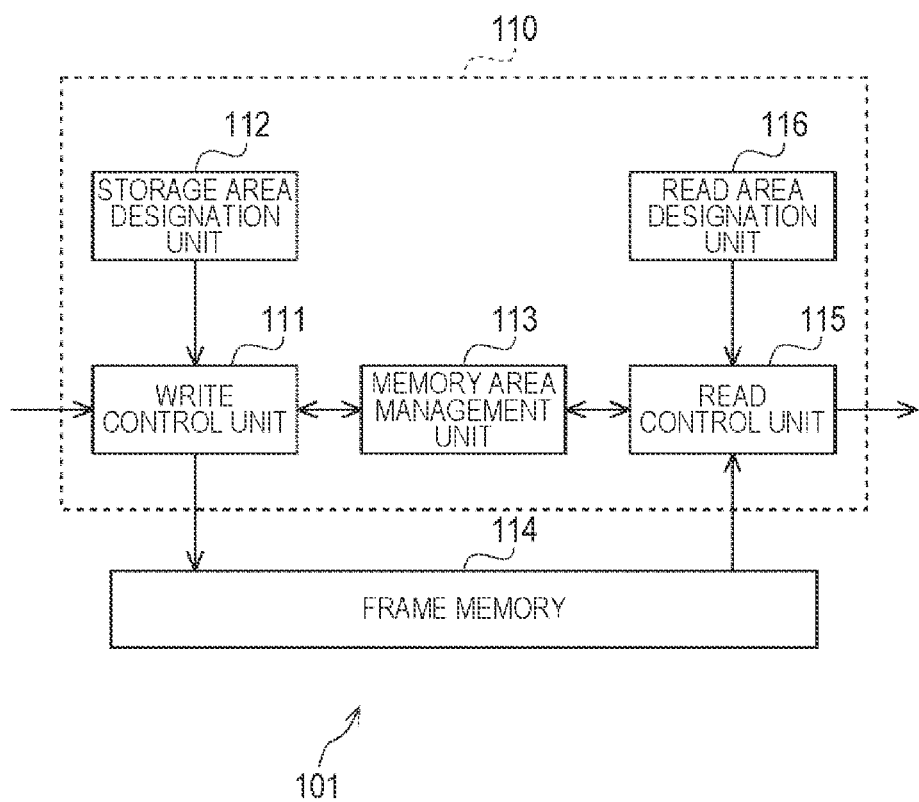
FIG. 4 is a block diagram illustrating a configuration example of an embodiment of an image processing apparatus to which the present disclosure is applied.

FIG. 4 illustrates a configuration example of an embodiment of an image processing apparatus to which the present disclosure is applied.

An image processing apparatus 101 has a function of camera shake correction by image stabilization processing (electronic image stabilization (EIS)).

The image processing apparatus 101 includes a write control unit 111, a storage area designation unit 112, a memory area management unit 113, a frame memory 114, a read control unit 115, and a read area designation unit 116. Furthermore, in the image processing apparatus 101, a memory control unit 110 includes the write control unit 111, the storage area designation unit 112, the memory area management unit 113, the read control unit 115, and the read area designation unit 116.

The write control unit 111 writes image data of an input image to be input in the frame memory 114 according to the storage area $A_S$ designated by the storage area designation unit 112. In the write processing, as the storage area $A_S$, for example, an area for cutting out (roughly) the periphery of the read area $A_R$ of the previous image frame (or the image frame before the previous image frame) is designated, and the image data of the input image corresponding to the area is written in the frame memory 114. A memory area allocated when the image data is written in the frame memory 114 is managed by the memory area management unit 113 using memory area management information.

The read control unit 115 reads the image data stored in the frame memory 114 according to the read area $A_R$ designated by the read area designation unit 116. In the read processing, as the read area $A_R$, the read area $A_R$ is designated with high accuracy on the basis of motion information from a sensor such as an inertial measurement unit (IMU), for example, and the image data corresponding to the area is read from the frame memory 114. The memory area for reading the image data stored in the frame memory 114 is managed by the memory area management unit 113 using the memory area management information.

Example of Dynamic Management of Memory

FIGS. 5A, 5B, and 5C are timing charts representing dynamic management of a memory in the image processing apparatus 101 of FIG. 4 on a time axis.

The timing charts of FIGS. 5A and 5B represent algorithm processing of calculating the storage area AS and the read area AR for temporally consecutive image frames (Frame #0, Frame #1), and input and output of image data on a time axis. Since description for the timing charts of FIGS. 5A and 5B are similar to the description for the timing charts of FIGS. 3A and 3B described above if "frame memory 14" is replaced with "frame memory 114", the description will be omitted.

The timing chart of FIG. 5C represents the memory use amount of the frame memory 114 on a time axis. Focusing on the memory use amount by the image frame #0, a memory area is allocated when the image frame #0 is stored in the frame memory 114, and the memory use amount continues to increase from time t11 to time t12. Thereafter, storage of the image frame #0 is completed, and reading of the image frame #0 is started at time t13.

Here, when reading of the image frame #0 is started at time t13, the memory area that has been storing the image data corresponding to the difference area $A_D$ is freed. As a result, the memory use amount rapidly decreases at the time of start of reading of the image frame #0. Then, when reading of the image frame #0 is started at time t13, the memory area from which the image frame #0 has been read is sequentially freed, and the memory use amount gradually decreases until the reading of the image frame #0 is completed at time t14.

Furthermore, at time t13, storage of the image frame #1 is started. Focusing on the memory use amount by the image frame #1, a memory area is allocated when the image frame #1 is stored in the frame memory 114, and the memory use amount continues to increase from time t13 to time t14. From time t13 to time t14, since the reading of the image frame #0 and the storage of the image frame #1 are performed at the same time, the total memory use amount by the image frame #0 and the image frame #1 continues to increase gently as compared with time t11 to time t12.

Here, focusing on the memory use amount by the image frame #0 at time t14, since the memory area storing the image data corresponding to the difference area $A_D$ has been freed previously, the memory area used at a time point when the reading of the image frame #0 is completed is all freed.

Therefore, focusing on the total memory use amount, although the memory use amount increases according to the storage of the image frame #1, the memory use amount as a whole is reduced, and the memory capacity required to be prepared in advance by the frame memory 114 is memory capacity MC2. That is, when the timing chart of FIG. 5C is compared with the timing chart of FIG. 3C, memory capacity MC2 in FIG. 5C can be reduced as compared with memory capacity MC1 in FIG. 3C by advancing the free timing of the memory area corresponding to the difference area AD and lowering the peak of the total memory use amount.

Furthermore, although the timing chart of FIG. 5C illustrates a case where the memory area corresponding to the difference area AD in the image frame #0 is freed before the start of read processing of the image frame #0, the memory area corresponding to the difference area AD may be freed in the middle of the read processing of the image frame #0. That is, in the timing chart of FIG. 5C, freeing of the memory area corresponding to the difference area AD at any timing between time t13 and time t14 can also advance the free timing of the memory area as compared with the timing chart of FIG. 3C, and thus the memory capacity can be reduced. However, as the free timing of the memory area is earlier, the peak of the total memory use amount can be lowered to reduce the memory capacity. Therefore, by freeing the memory area corresponding to the difference area AD before the start of read processing of the image frame #0, the memory capacity prepared in advance by the frame memory 114 can be efficiently reduced.

Example of Read Processing and Free Processing

Figure 6:
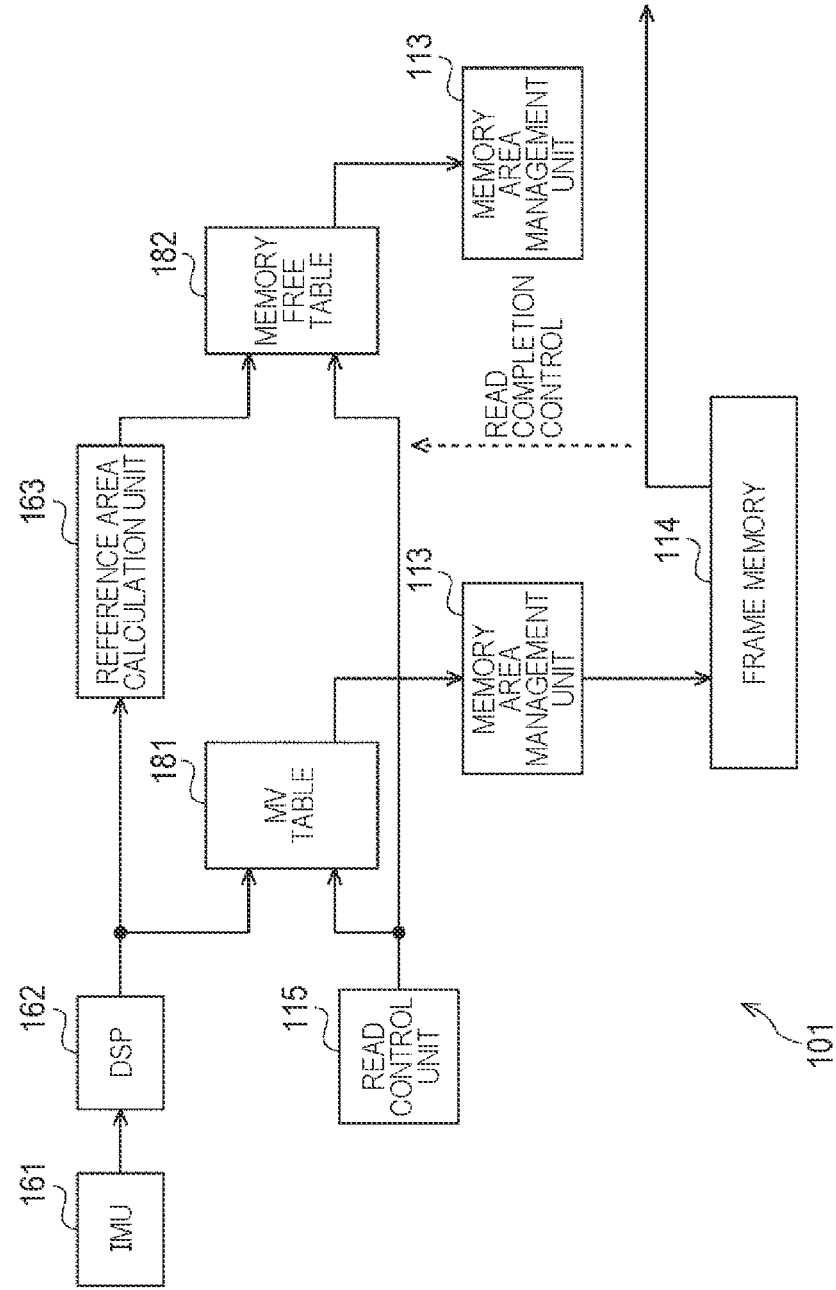
FIG. 6 is a diagram for describing read processing and free processing in the image processing apparatus of FIG. 4.

FIG. 6 illustrates an example of read processing of image data stored in a memory and free processing of a memory area in the image processing apparatus 101 of FIG. 4.

In FIG. 6, in the image processing apparatus 101, in order to achieve read processing of image data stored in the frame memory 114 by write processing and free processing of a memory area, an IMU 161, a digital signal processor (DSP) 162, and a reference area calculation unit 163 are provided in addition to the memory area management unit 113 and the read control unit 115. The reference area calculation unit 163 can be included in the function of the read area designation unit 116. Furthermore, in the image processing apparatus 101, an MV table 181 and a memory free table 182 are recorded as management information in a storage device such as a random access memory (RAM).

The IMU 161 detects angular velocity, acceleration, and the like by a three-axis gyroscope or a three-axis accelerometer, and supplies motion information corresponding to the detection result to the DSP 162. The DSP 162 performs digital signal processing using the motion information from the IMU 161. Here, the DSP 162 calculates an output block number and reference destination coordinates by performing image stabilization processing on the basis of the motion information from the IMU 161. As a result, reference destination coordinates corresponding to an output block number are recorded in the MV table 181.

FIG. 7 illustrates an example of the MV table 181. In FIG. 7, reference destination coordinates indicating the position of the reference destination in an XY coordinate system in the read area $A_R$ to be the image area to be processed are associated with an output block number corresponding to the position of an output block constituting the output image $I_{out}$. That is, coordinates in the read area $A_R$ corresponding to an output image position are recorded in the MV table 181, and the coordinates in the read area $A_R$ can be returned by passing the output image position.

The reference area calculation unit 163 calculates a reference area on the basis of the reference destination coordinates from the DSP 162. Furthermore, the reference area calculation unit 163 calculates last reference timing on the basis of the calculated reference area and the output block number from the DSP 162. As a result, information regarding free timing corresponding to an image area number is recorded in the memory free table 182. That is, since the timing of reading the image area corresponding to the reference destination coordinates (reference area) is determined when the MV table 181 is created, from the relationship between them, information regarding free timing can be recorded for each image area in the memory free table 182.

Figure 8:
FIG. 8 is a diagram illustrating an example of a memory free table.

FIG. 8 illustrates an example of the memory free table 182. In FIG. 8, information regarding free timing corresponding to an image area number allocated for each image area is recorded. An output block number is recorded as the information regarding free timing. That is, free timing is recorded for each image area in the memory free table 182, and the image area to be freed can be returned by passing an output image position.

More specifically, in the memory free table 182, the initial state of free timing corresponding to each image area number is set to a value indicating "0th" (value of initial state), and the value is overwritten and recorded with an output block number (predetermined value) by which the image area is read last. As a result, information regarding free timing is not overwritten for the image area that is not read, and the value remains at the value indicating "0th". Therefore, in the memory free table 182, an image area having the image area number of which free timing is a value indicating "0th" is set as the difference area $A_D$ which is an area where the image data is stored but is not read, and it is only required to free the memory area thereof.

Figure 9:
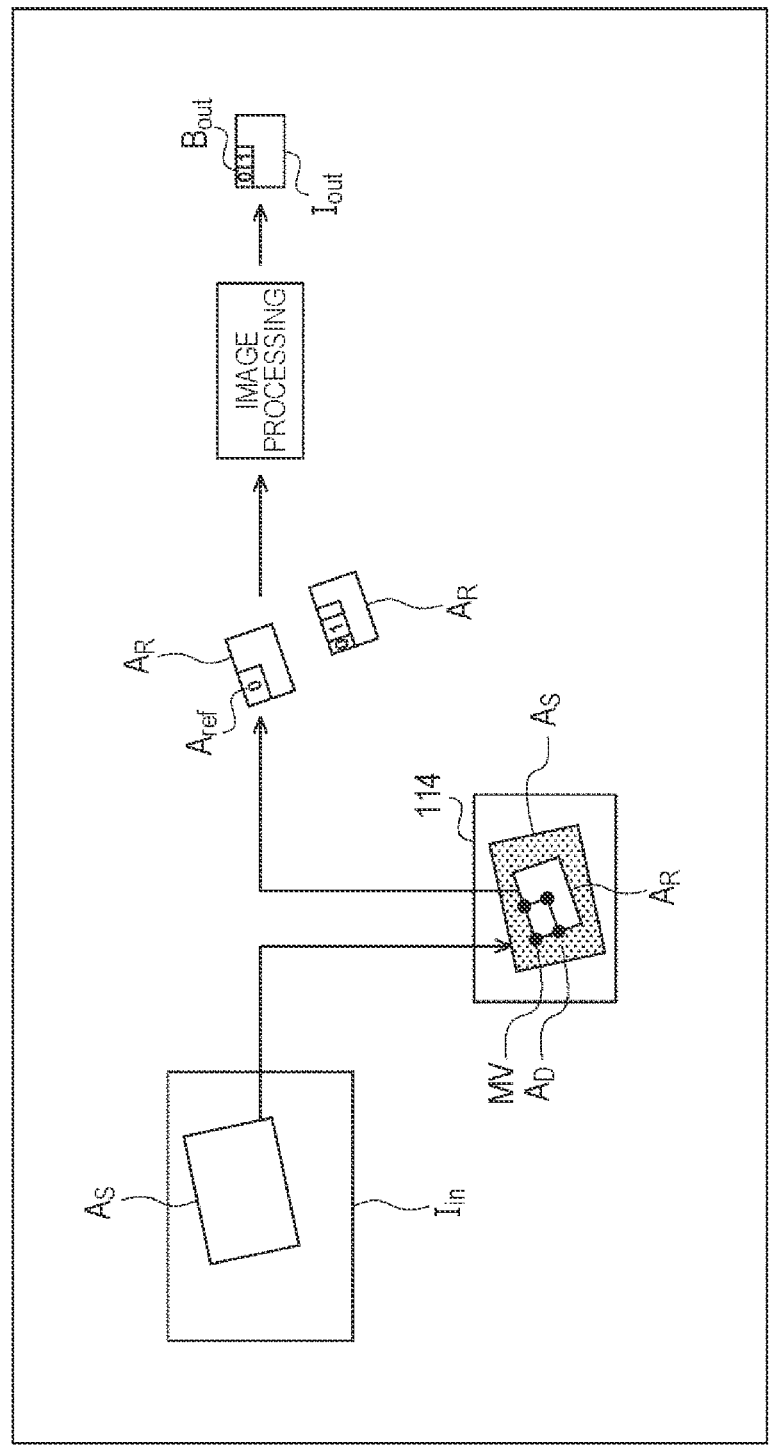
FIG. 9 is a diagram for describing a relationship between a reference area and an output block.

FIG. 9 illustrates a relationship between a reference area and an output block. In FIG. 9, while it has been described above that the difference between the storage area $A_S$ and the read area $A_R$ is the difference area $A_D$, reference destination coordinates MV represent, in the XY coordinate system, the coordinates of a reference destination in the read area $A_R$, and a reference area $A_{ref}$ in the read area $A_R$ is specified from the reference destination coordinates MV. The output image $I_{out}$ includes a plurality of output blocks $B_{out}$ arranged in order from the upper left to the lower right of the image. While the reference area $A_{ref}$ and the output block $B_{out}$ are associated with each other, in each reference area $A_{ref}$, there is a case where there is an image area overlapping with another reference area $A_{ref}$. Therefore, in the memory free table 182, an output block number by which an image area to be processed is read last is recorded as free timing.

As described above, the memory free table 182 records information regarding an area of image data read from the frame memory 114 by read processing. This information is used as information regarding free timing of a memory area, and is also used as information regarding the area where image data is stored but is not read (memory area corresponding to the difference area $A_D$). Further, by using the information recorded in the memory free table 182, it is possible to free the memory area corresponding to the area for which the value of initial state is set as the free timing (the difference area $A_D$ which is an image area not to be processed) among the areas (image areas) of the image data stored in the frame memory 114 when read processing is started.

Returning to FIG. 6, by the read control unit 115 passing an output block number to the MV table 181, reference destination coordinates corresponding to the output block number are returned. These coordinates are converted into a physical address by the memory area management unit 113 on the basis of the memory area management information. For example, conversion into a physical address is performed from an image area number managing an image area stored in the frame memory 114 in units of 64×64. Then, by accessing the frame memory 114 according to the physical address, image data of the reference area is read for each output block.

Furthermore, by the read control unit 115 passing an output block number to the memory free table 182, a search is performed with the output block number as free timing. As a result, an image area to be freed is specified, and the memory area management unit 113 is notified of a free instruction of the image area number. The memory area management unit 113 frees the memory area to be freed corresponding to the free instruction on the basis of the memory area management information. For example, in a case where an image area stored in the frame memory 114 is managed in units of 64×64, the memory area of an instructed image area number is freed. Note that, when the memory free table 182 is referred to, read completion control is performed.

Next, a flow of processing related to reading of an image frame and freeing of a memory area will be described with reference to a flowchart of FIG. 10.

In step S101, the memory free table 182 is initialized. In step S102, the DSP 162 calculates reference destination coordinates by stabilization algorithm processing. As a result, information regarding reference destination coordinates (MV information) corresponding to an output block number is recorded in the MV table 181 (S103).

In step S104, the reference area calculation unit 163 calculates a reference area from the information regarding reference destination coordinates (MV information). In step S105, the reference area calculation unit 163 calculates, from information regarding reference area (reference area information) and an output block number, last reference timing at which the image area corresponding to the reference area is read last. As a result, the last reference timing is recorded in the memory free table 182 as free timing associated with an image area number (S106).

In step S107, the read control unit 115 refers to the MV table 181 and calculates reference destination coordinates from the information regarding reference destination coordinates (MV information) corresponding to an output block number. In step S108, the memory area management unit 113 converts the reference destination coordinates into a physical address using the memory area management information. In step S109, by the read control unit 115 performing access according to the physical address, a reference image corresponding to the reference area is read from the frame memory 114 for each output block, and the reading is completed (S110).

In step S111, by the read control unit 115 referring to the memory free table 182 and performing a search with an output block number as free timing, an image area to be freed is searched for. In step S112, the memory area management unit 113 frees the memory area corresponding to the image area to be freed using the memory area management information.

As described above, by performing the processing related to reading of an image frame and freeing of a memory area, the memory area corresponding to the image area to be freed can be freed using the information recorded in the memory free table 182, and the memory area corresponding to the area for which the value of initial state (value indicating "0th") is set as the free timing can be freed when read processing is started. As a result, free timing of the memory area corresponding to the difference area $A_D$ which is an image area not to be processed can be advanced and the peak of the memory use amount can be lowered, and thus the memory capacity prepared in advance by the frame memory 114 can be reduced.

Another Example of Memory Free Table

By expressing an image area not to be processed and read as the area to be freed 0th (first) in the memory free table 182, a memory area is freed at the same time when the first read processing is performed, and thus no special processing is required for freeing the memory area corresponding to the image area that is not read.

Furthermore, by expressing an image area where image data is stored but is not read (difference area $A_D$) with an invalid flag in the memory free table 182, free processing can be performed at the timing when the table is completed, and thus the free timing can be further advanced. That is, by expressing an image area that is not used at all with a special flag, with an invalid flag, an image area that is not read can be freed before the 0th (first) freeing is performed.

FIGS. 11A, 11B, and 11C are timing charts representing, on a time axis, dynamic management of the frame memory 114 in a case where an invalid flag is used in the memory free table 182.

The timing charts of FIGS. 11A and 11B represent algorithm processing of calculating the storage area AS and the read area AR for temporally consecutive image frames, and input and output of image data on a time axis. Since description for the timing charts of FIGS. 11A and 11B are similar to the description for the timing charts of FIGS. 5A and 5B described above, the description will be omitted.

The timing chart of FIG. 11C represents the use amount of the frame memory 114 on a time axis. Focusing on the memory use amount when the image frame #0 is stored, a memory area is allocated when the image frame #0 is stored, and the memory use amount continues to increase from time t11 to time t12.

At this time, since an image area that is not read is represented by an invalid flag in the memory free table 182, free processing can be performed at the timing at which the table is completed. That is, in the free processing, the memory area corresponding to the difference area $A_D$ as the image area represented by an invalid flag can be freed before read processing is performed. Here, at time t21 before time t13 at which read processing of the image frame #0 is started, the memory area corresponding to the difference area $A_D$ is freed.

When the timing chart of FIG. 11C is compared with the timing chart of FIG. 5C, free timing of the difference area AD can be further advanced by using an invalid flag, and the peak of the total memory use amount can be lowered. As a result, the memory capacity required to be prepared in advance by the frame memory 114 can be reduced.

Example of Case where Start of Read Processing is Late

FIGS. 12A, 12B, 12C, 13A, 13B, and 13C are timing charts representing, on a time axis, dynamic management of the frame memory 114 in a case where start of read processing is late.

Figures 12A, 12B, 12C:
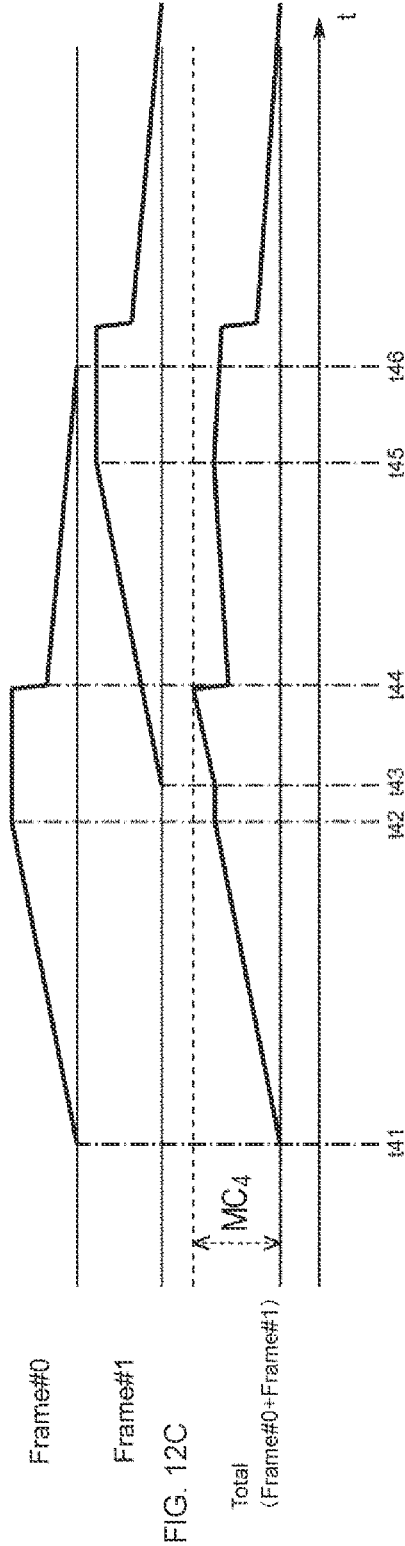
FIGS. 12A, 12B, and 12C are timing charts representing, on a time axis, dynamic management of a memory in a case where start of read processing is late.

The timing charts of FIGS. 12A and 12B represent algorithm processing of calculating the storage area AS and the read area AR for temporally consecutive image frames, and input and output of image data on a time axis. Since description for the timing chart of FIG. 12A is similar to the description for the timing chart of FIGS. 5A and 11 described above, the description will be omitted.

In FIG. 12B, write processing of the image frame #0 is performed (time t41 to time t42), and image data of the storage area AS in the image frame #0 is stored in the frame memory 114. Thereafter, before read processing of the image frame #0 is started (at time t43 before time t44), write processing of the image frame #1 is started. Read processing of the image frame #0 is started when write processing of the image frame #1 is being performed. That is, since the timing at which read processing of the image frame #0 is started is late, write processing of the image frame #1 is started before read processing of the image frame #0 is started.

The timing chart of FIG. 12C represents the use amount of the frame memory 114 on a time axis. Focusing on the memory use amount by the image frame #0, a memory area is allocated when the image frame #0 is stored, and the memory use amount continues to increase from time t41 to time t42. Furthermore, focusing on the memory use amount by the image frame #1, a memory area is allocated when the image frame #1 is stored, and the memory use amount continues to increase from time t43 to time t45.

Therefore, even after storage of the image frame #0 is completed, if storage of the image frame #1 is started, the total memory use amount by the image frame #0 and the image frame #1 continues to increase. Here, in a case where the memory area corresponding to the difference area $A_D$ in the image frame #0 is freed at the time of start of read processing of the image frame #0, at time t44, the memory use amount rapidly decreases at the time of start of reading of the image frame #0.

As described above, in a case where start of read processing of the image frame #0 is late, the memory capacity required to be prepared in advance by the frame memory 114 tends to increase due to overlapping with the timing at which write processing of the next image frame #1 is started or the like. On the other hand, in a case where an invalid flag is used in the memory free table 182, since the timing of freeing the memory area corresponding to the difference area $A_D$ can be advanced, it is possible to cope with the case where start of read processing is late.

In the timing chart of FIG. 13C, the memory area corresponding to the difference area AD as the image area represented by an invalid flag is freed at time t51 before read processing of the image frame #0 is performed. When the timing chart of FIG. 13C is compared with the timing chart of FIG. 12C, free timing of the memory area corresponding to the difference area AD is further advanced from time t44 to time t51 by using an invalid flag, and the peak of the total memory use amount is lowered. As a result, the memory capacity required to be prepared in advance by the frame memory 114 can be further reduced from memory capacity MC4 to memory capacity MC5.

As described above, in the image processing apparatus 101 to which the present disclosure is applied, as dynamic management of the frame memory 114 (allocation and freeing of memory), a memory area where image data is stored but is not read is freed before read processing is completed and not after the read processing. Before read processing is completed includes before start of the read processing or in the middle of the read processing. By using such a memory management method, the total memory use amount can be reduced by advancing the free timing of a memory area where image data is stored but is not read, and thus the memory capacity of the frame memory 114 can be reduced. Furthermore, since the memory capacity of the frame memory 114 can be reduced, an equivalent function can be achieved even with a memory capacity smaller than the conventional memory capacity.

Meanwhile, in a case where it is desired to reduce the memory capacity and achieve a function with a memory capacity as small as possible, a way can be used in which a memory area is allocated when image data is stored and the image data is read for processing and the memory area that has become unnecessary is freed, by the storage and reading of image data operating like pipeline processing. By using such way of dynamic management, from the viewpoint of memory management, it is possible to increase the capacity that can be used for memory allocation for storage of next image data by freeing a memory area that has become unnecessary at as early timing as possible, and the total memory capacity to be prepared in advance can be reduced.

On the other hand, from the viewpoint of how to handle image data, it is conceivable to reduce the memory use amount by designating the storage area $A_S$ for storing an input image according to the processing content. However, depending on the circumstances of an image processing algorithm (for example, processing timing, processing accuracy, or the like), the read area $A_R$ of the image read for actual processing may not be the same area as the storage area $A_S$. For example, in a case where a wide area or the entire area in an input image is designated as the storage area $A_S$, it is assumed that the read area $A_R$ is smaller than the area, and the areas may not be the same.

In the way in which a memory area is allocated when image data corresponding to the storage area $A_S$ is stored and a memory area that is not required to be read for processing is freed, in a case where the read area $A_R$ does not become the same area as the storage area $A_S$, a memory area that is not read remains without being freed. Therefore, it is necessary to free this memory area. However, since the garbage collection described above is a technology for freeing a memory area that has remained after processing, it is insufficient from the viewpoint of memory management. Therefore, in the memory management method to which the present disclosure is applied, a memory area where image data is stored but is not read is freed before start of read processing or before the read processing is completed such as in the middle of the read processing, so that the memory capacity can be reduced. This makes it possible to cope with both viewpoints of the viewpoint of memory management and the viewpoint of how to handle image data.

Furthermore, in the memory management method to which the present disclosure is applied, since the memory use amount of the frame memory 114 can be reduced and there is room in the memory use amount as compared with the current memory management method in a case where the memory capacity is the same, the storage area $A_S$ can be roughly designated As a result, arithmetic processing is simplified, and thus, for example, an arithmetic amount of the DSP 162 is reduced, and reduction of clock speed and power reduction are achieved. Moreover, since there is room in the memory use amount, it is possible to increase a margin when an area is designated, and it is possible to sufficiently cope with uncertainty such as intense movement of a target object (object) by securing a wider peripheral area.

2. Second Embodiment

Configuration Example of Apparatus

Figure 14:
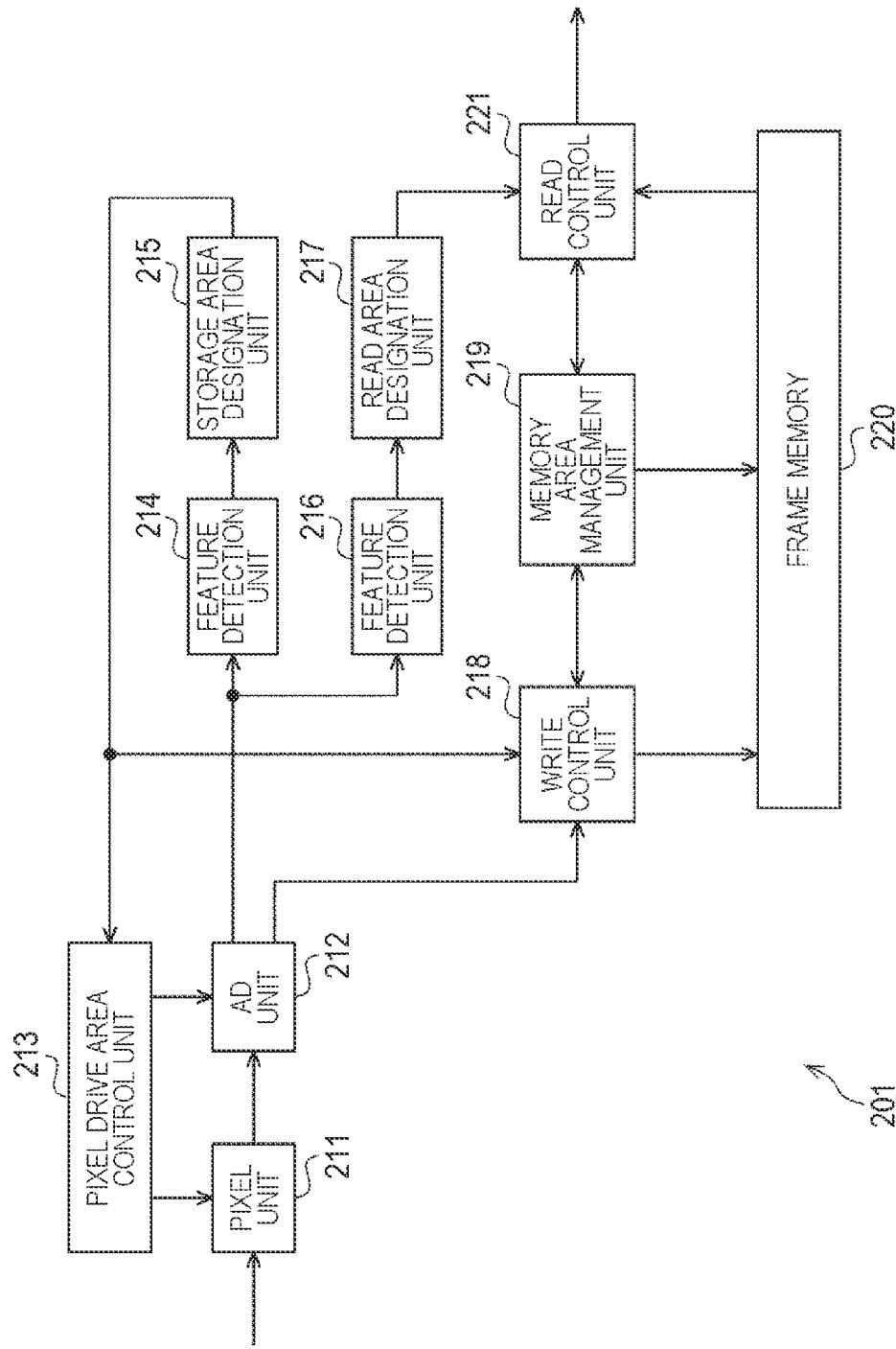
FIG. 14 is a block diagram illustrating another configuration example of an embodiment of an image processing apparatus to which the present disclosure is applied.

FIG. 14 illustrates another configuration example of an embodiment of an image processing apparatus to which the present disclosure is applied.

An image processing apparatus 201 has a region of interest (ROI) function capable of designating a specific area in an image as an ROI area. The image processing apparatus 201 includes a pixel unit 211, an AD unit 212, a pixel drive area control unit 213, a feature extraction unit 214, a storage area designation unit 215, a feature extraction unit 216, a read area designation unit 217, a write control unit 218, a memory area management unit 219, a frame memory 220, and a read control unit 221.

The pixel unit 211 is configured as a pixel array in which a plurality of pixels is two-dimensionally arranged. The pixel unit 211 converts light from a subject into an electric signal. The AD unit 212 converts the pixel signal from the pixel unit 211 from an analog signal to a digital signal.

The pixel drive area control unit 213 controls the pixel drive areas in the pixel unit 211 and the AD unit 212 on the basis of area information fed back from the subsequent stage. By the control of the pixel drive areas, the image data from the AD unit 212 is supplied to the feature extraction unit 214, the feature extraction unit 216, and the write control unit 218.

The feature extraction unit 214 detects feature information by performing simple processing such as detection of a luminance change or tracking on the image data from the AD unit 212, and supplies the processing result to the storage area designation unit 215. The storage area designation unit 215 designates the storage area $A_S$ on the basis of the processing result from the feature extraction unit 214. Area information regarding the storage area $A_S$ is supplied to the pixel drive area control unit 213 and the write control unit 218.

The feature extraction unit 216 detects feature information by performing highly accurate processing such as object detection by AI processing such as deep neural network (DNN) on the image data from the AD unit 212, and supplies the processing result to the read area designation unit 217. The read area designation unit 217 designates the read area $A_R$ on the basis of the processing result from the feature extraction unit 216. Area information regarding the read area $A_R$ is supplied to the read control unit 221.

The write control unit 218 writes the image data from the AD unit 212 in the frame memory 220 according to the storage area $A_S$ designated by the storage area designation unit 215. A memory area allocated when the image data is written in the frame memory 220 is managed by the memory area management unit 219.

The read control unit 221 reads the image data stored in the frame memory 220 according to the read area $A_R$ designated by the read area designation unit 217. The memory area for reading the image data stored in the frame memory 220 is managed by the memory area management unit 219.

In the image processing apparatus 201 configured as described above, the storage area $A_S$ is roughly designated on the basis of the result of simple processing using a low-resolution imaged image (detection processing of luminance change or the like), and image data of a partial area (limited area) of a high-resolution imaged image is stored in the frame memory 220 according to the storage area $A_S$. Furthermore, the read area $A_R$ is designated on the basis of a result of highly accurate processing using a low-resolution imaged image (AI processing such as DNN processing), and the image data stored in the frame memory 220 is read according to the read area $A_R$.

Here, if the processing performed by the image processing apparatus 201 of FIG. 14 is described with reference to FIGS. 15A, 15B, 15C, and 15D, the following processing is performed.

That is, in the first imaging, a low-resolution imaged image (low-resolution imaged image IL of FIG. 15B) obtained by imaging the entire area including an object (object) (FIG. 15A) at low resolution is obtained. Using this low-resolution imaged image, the feature extraction unit 214 performs simple processing such as detection of a luminance change. Using the processing result, the storage area designation unit 215 designates the storage area AS (storage area AS of FIG. 15B). As a result, the area where the existence of the object is predicted is roughly determined using the feature information detected by the simple processing in which processing is completed in a short time, and the storage area AS is determined.

Subsequently, in the second imaging, by the pixel drive area control unit 213 controlling the pixel unit 211 and the AD unit 212 on the basis of the designated storage area AS, a high-resolution imaged image (high-resolution imaged image $I_H$ of FIG. 15C) obtained by imaging a target area (storage area $A_S$ of FIG. 15C) with high resolution is obtained. The write control unit 218 stores the image data of the area including the object in the high-resolution imaged image (storage area $A_S$ of FIG. 15C) in the frame memory 220 on the basis of the designated storage area $A_S$.

Figure 15A:
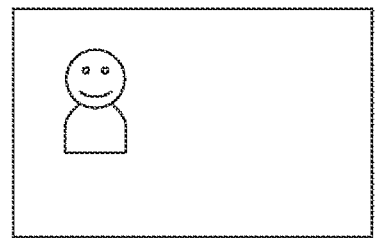
FIGS. 15A, 15B, 15C, and 15D are diagrams schematically representing an example of an image to be processed.
Figure 15B:
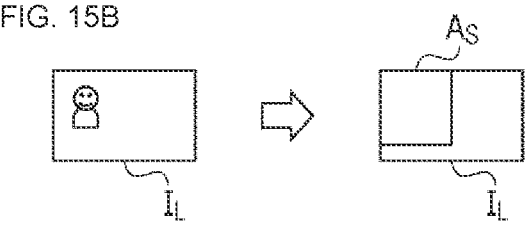
Figure 15C:
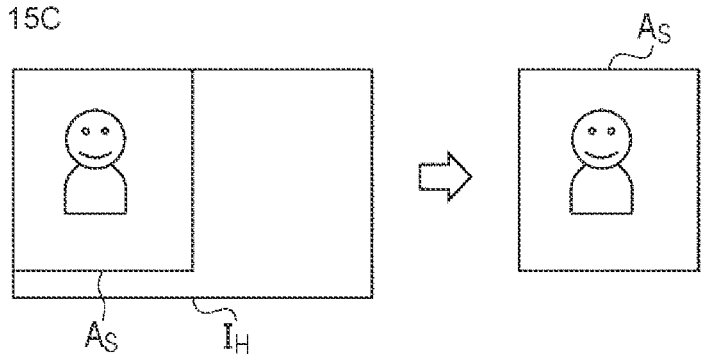
Figure 15D:
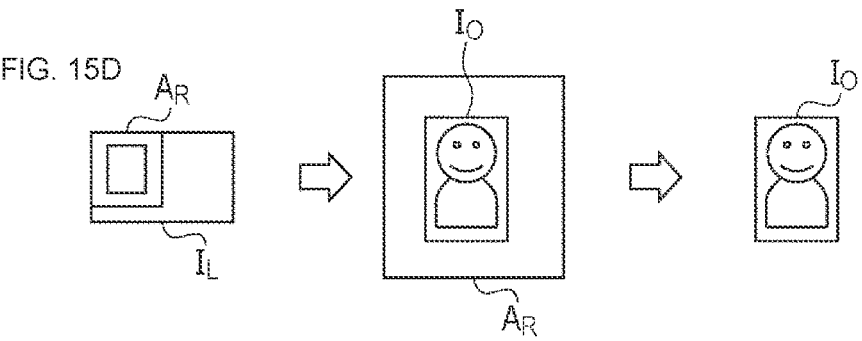

Furthermore, the feature extraction unit 216 performs highly accurate processing such as DNN processing using the low-resolution imaged image obtained in the first imaging (low-resolution imaged image $I_L$ of FIG. 15B). Using the processing result, the read area designation unit 217 designates the read area $A_R$ (read area $A_R$ of FIG. 15D). As a result, the object is more accurately determined using the feature information detected by the highly accurate processing in which the processing time is long but the accuracy is high, and the read area $A_R$ is determined. By the read control unit 221 reading the image data of the high-resolution imaged image stored in the frame memory 220 on the basis of the designated read area $A_R$, a high-resolution object image $I_O$ (object image $I_O$ of FIG. 15D) is output.

As described above, the simple processing by the feature extraction unit 214 and the highly accurate processing by the feature extraction unit 216 are different algorithms, and the time required for the processing and the accuracy of the processing result are different, but the simple processing and the highly accurate processing are used properly according to the purpose of the processing. Furthermore, in the first imaging, since the entire area is imaged at low resolution and the resolution is reduced as compared with the case of imaging at high resolution, power consumption can be reduced. On the other hand, in the second imaging, imaging is performed at high resolution, but since the area is limited, power consumption can be reduced as compared with the case of imaging the entire area.

Furthermore, since the frame memory 220 stores not the entire area of a high-resolution imaged image but the image data of the storage area $A_S$ that can be a processing target, memory capacity can be saved and power consumption can be reduced. Furthermore, while reduction of a memory capacity is required in a sensor or the like in which logic, a memory, and the like are stacked, this requirement can be satisfied.

Example of Read Processing and Free Processing

FIG. 16 illustrates an example of read processing of image data stored in a memory and free processing of a memory area in the image processing apparatus 201 of FIG. 14.

In FIG. 16, in the image processing apparatus 201, in order to achieve read processing of image data of a high-resolution imaged image stored in the frame memory 220 by write processing and free processing of a memory area, an imaging unit 261, a DNN unit 262, and a reference area calculation unit 263 are provided in addition to the memory area management unit 219 and the read control unit 221. The DNN unit 262 is included in the function of the feature extraction unit 216. The reference area calculation unit 263 can be included in the function of the read area designation unit 217. Furthermore, in the image processing apparatus 201, an object area coordinate table 281 and a memory free table 282 are recorded in a storage device.

The imaging unit 261 includes the pixel unit 211 and the AD unit 212. The imaging unit 261 performs low-resolution imaging, and supplies the image data of the low-resolution imaged image to the DNN unit 262. The DNN unit 262 performs DNN processing using the image data of the low-resolution imaged image from the imaging unit 261. By the DNN processing, an object is detected with high accuracy, and the coordinates of the object (object coordinates) are calculated. As a result, as illustrated in FIG. 17, the coordinate range of the read area $A_R$ is recorded in the object area coordinate table 281 in association with the object number of the detected object. That is, coordinates of the read area $A_R$ of an object are recorded in the object area coordinate table 281, and the coordinates of the read area $A_R$ can be returned by passing an output image position.

Figure 18:
FIG. 18 is a diagram illustrating an example of a memory free table.

The reference area calculation unit 263 calculates a reference area on the basis of the object coordinates from the DNN unit 262. Furthermore, the reference area calculation unit 263 calculates last reference timing on the basis of the calculated reference area and an output block number. As a result, as illustrated in FIG. 18, information regarding free timing is recorded in the memory free table 282 in association with an image area number. That is, free timing for each image area is recorded in the memory free table 282, and the image area to be freed can be returned by passing an output image position. For example, in the memory free table 282, similarly to the memory free table 182 of FIG. 8, by setting the initial state of free timing to a value indicating "0th", with the image area of which free timing is the value indicating "0th" without being overwritten as the difference area $A_D$ which is an area where image data is stored but is not read, memory area thereof can be freed.

By the read control unit 221 passing an output block number to the object area coordinate table 281, the coordinates of the read area $A_R$ corresponding to the output block number (reference destination coordinates) are returned. These coordinates are converted into a physical address by the memory area management unit 219 on the basis of the memory area management information. Then, by accessing the frame memory 220 according to the physical address, image data of the reference area is read for each output block.

Furthermore, by the read control unit 221 passing an output block number to the memory free table 282, a search is performed with the output block number as free timing. As a result, an image area to be freed is specified, and the memory area management unit 219 is notified of a free instruction of the image area number. The memory area management unit 219 frees the memory area to be freed corresponding to the free instruction on the basis of the memory area management information.

Figure 19:
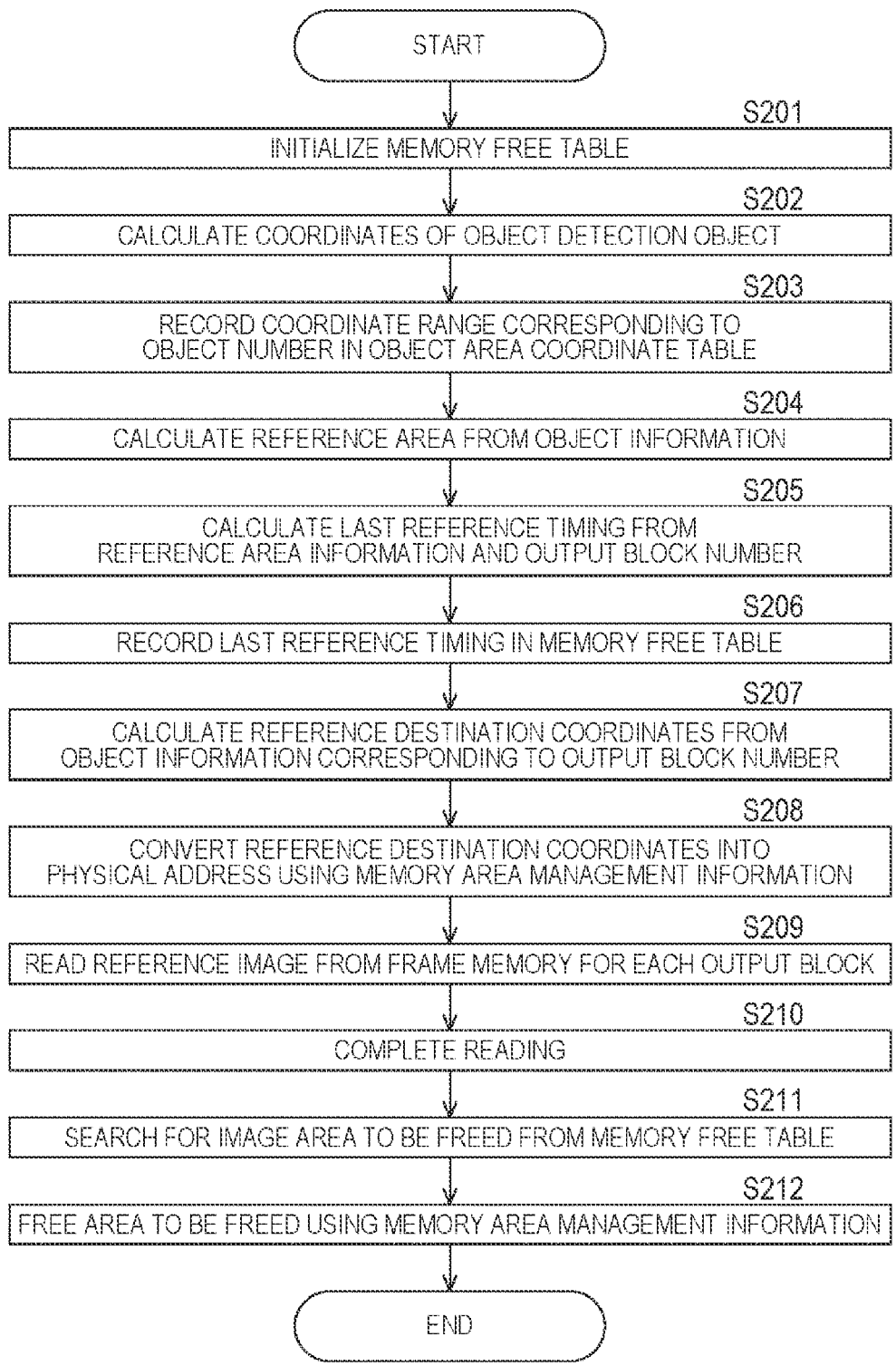
FIG. 19 is a flowchart for describing a flow of processing related to reading of an image frame and freeing of a memory area.

Next, a flow of processing related to reading of an image frame and freeing of a memory area will be described with reference to a flowchart of FIG. 19.

Figure 10:
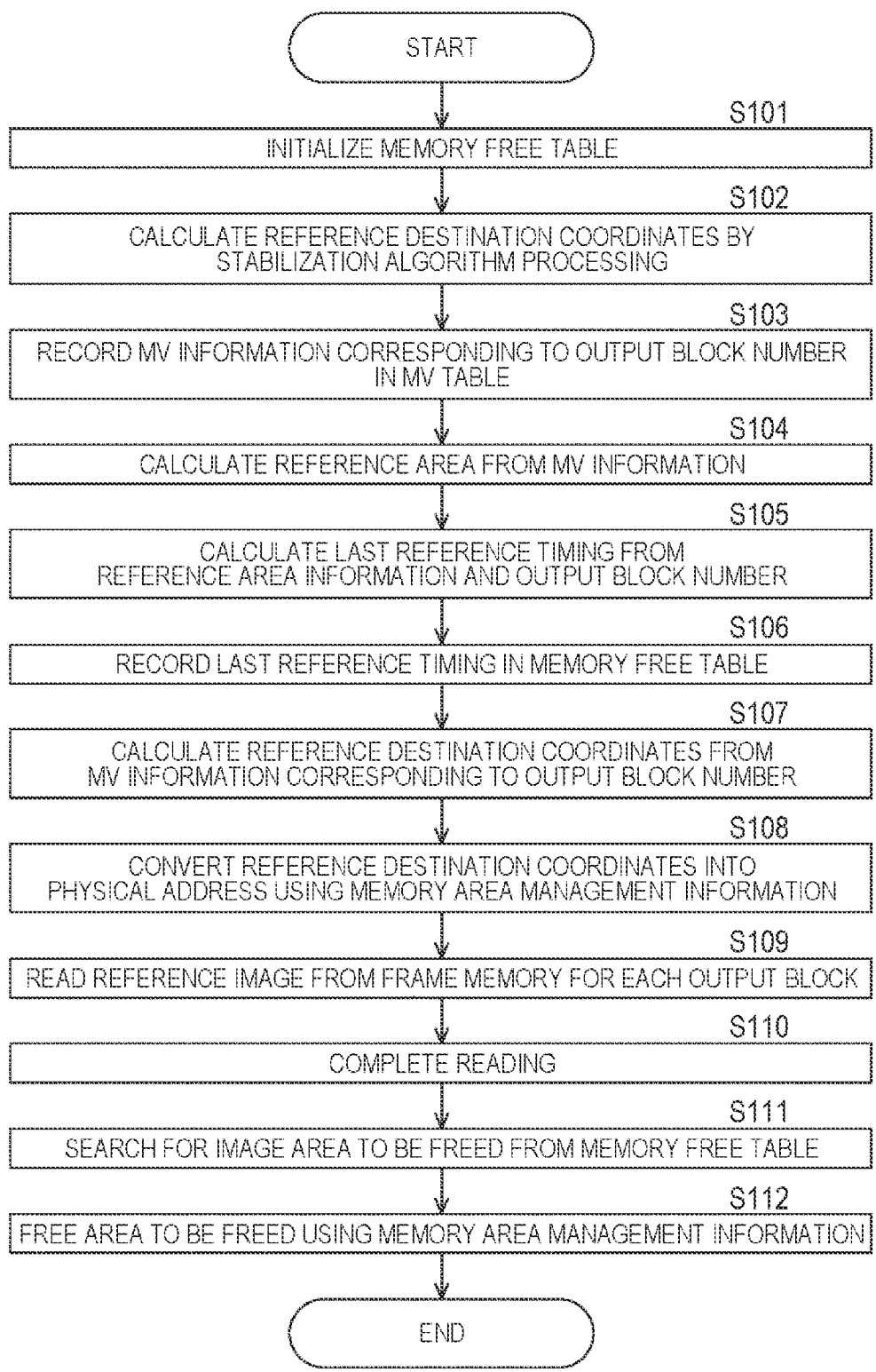
FIG. 10 is a flowchart for describing a flow of processing related to reading of an image frame and freeing of a memory area.

In steps S201 to S212, read processing and free processing are performed similarly to steps S101 to S112 in FIG. 10, but the following points are different. That is, object coordinates are detected by DNN processing (S202), and the coordinate range corresponding to an object number is recorded in the object area coordinate table 281 (S203). Furthermore, reference destination coordinates are calculated on the basis of information regarding object (S204). Note that, since the object area coordinate table 281 and the memory free table 282 are basically used in a manner similar to the use of the MV table 181 and the memory free table 182 described above, description therefor will be omitted here.

As described above, by performing the processing related to reading of an image frame and freeing of a memory area, the memory area corresponding to the image area to be freed can be freed using the information recorded in the memory free table 282, and the memory area corresponding to the area for which the value of initial state (value indicating "0th") is set as the free timing can be freed when read processing is started. As a result, free timing of the memory area corresponding to the difference area $A_D$ which is an image area not to be processed can be advanced and the peak of the memory use amount can be lowered.

As described above, in the image processing apparatus 201 to which the present disclosure is applied, when processing related to ROI is performed, the storage area $A_S$ is roughly designated by information such as a detection result of luminance change of a low-resolution imaged image, and a partial area of a high-resolution imaged image is stored in the frame memory 220, and the stored partial area of the high-resolution imaged image is read according to the read area $A_R$ designated with high accuracy by AI processing such as DNN processing of the low-resolution imaged image.

At this time, it is assumed that the storage area $A_S$ and the read area $A_R$ are not the same area, and there is a possibility that the memory area corresponding to the difference area $A_D$ remains without being freed. However, by performing the above-described processing, free timing of the memory area corresponding to the difference area $A_D$, which is an image area not to be processed and read, can be advanced. Therefore, the memory capacity prepared in advance by the frame memory 220 can be reduced.

3. Third Embodiment

Configuration Example of Apparatus

Figure 20:
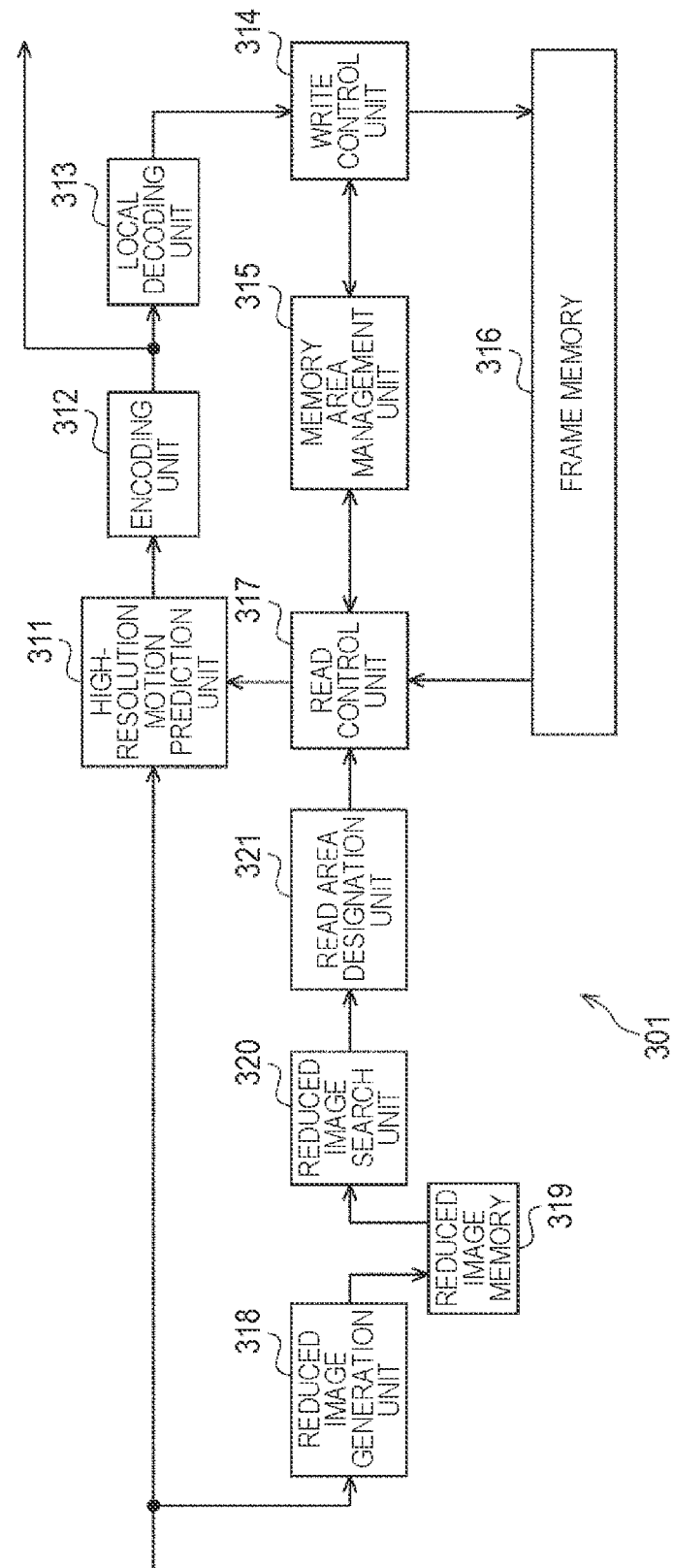
FIG. 20 is a block diagram illustrating another configuration example of an embodiment of an image processing apparatus to which the present disclosure is applied.

FIG. 20 illustrates another configuration example of an embodiment of an image processing apparatus to which the present disclosure is applied.

An image processing apparatus 301 has a codec function. The image processing apparatus 301 includes a high-resolution motion prediction unit 311, an encoding unit 312, a local decoding unit 313, a write control unit 314, a memory area management unit 315, a frame memory 316, a read control unit 317, a reduced image generation unit 318, a reduced image memory 319, a reduced image search unit 320, and a read area designation unit 321.

The high-resolution motion prediction unit 311 predicts the motion of an object from the image data of an input image (original image) input thereto and the image data of a reference image from the read control unit 317, and supplies the prediction result to the encoding unit 312. The encoding unit 312 performs encoding according to a predetermined way of encoding on the basis of the prediction result from the high-resolution motion prediction unit 311, and outputs encoded data obtained by the encoding to the outside. Furthermore, the local decoding unit 313 performs local decoding according to a predetermined way of decoding on the encoded data from the encoding unit 312, and supplies image data obtained by the local decoding to the write control unit 314.

The write control unit 314 writes the image data from the local decoding unit 313 in the frame memory 316. A memory area allocated when the image data is written in the frame memory 316 is managed by the memory area management unit 315. The read control unit 317 reads the image data stored in the frame memory 316 according to the read area $A_R$ designated by the read area designation unit 321, and supplies the image data to the high-resolution motion prediction unit 311.

Figure 21A:
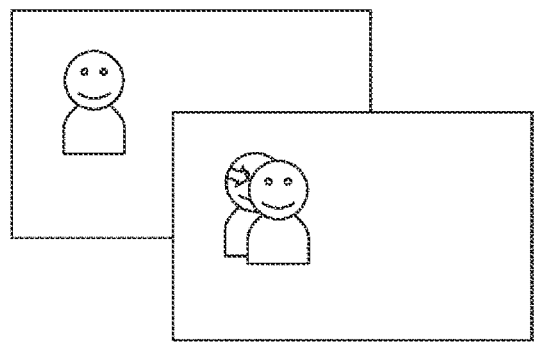
FIGS. 21A, 21B, and 21C are diagrams schematically representing an example of an image to be processed.
Figure 21B:
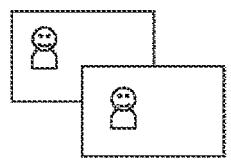
Figure 21C:
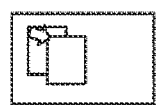

Here, the read area $A_R$ designated by the read area designation unit 321 is designated as follows. That is, if description is given while explaining FIGS. 21A, 21B, and 21C, the reduced image generation unit 318 generates a reduced image (FIG. 21B) from the original image (FIG. 21A) as the input image, and stores the image data of the reduced image in the reduced image memory 319. The reduced image search unit 320 performs search processing on the image data of the reduced image stored in the reduced image memory 319 and calculates a reduced image vector (FIG. 21C), and supplies the processing result to the read area designation unit 321. The read area designation unit 321 designates the read area AR on the basis of the processing result from the reduced image search unit 320.

In the image processing apparatus 301 configured as described above, when performing processing related to codec, the read area $A_R$ is designated by a search using a reduced image processed in a path different from the original image. Therefore, it is assumed that the read area $A_R$ is not the same area as the area (storage area $A_S$) when the image data obtained by local decoding is stored in the frame memory 316. As described above, in a case where the storage area $A_S$ and the read area $A_R$ are not the same area, there is a possibility that the memory area corresponding to the difference area $A_D$ remains without being freed.

Also in the image processing apparatus 301, similarly to the image processing apparatus 101 (FIG. 4) or the image processing apparatus 201 (FIG. 14) described above, the memory capacity prepared in advance by the frame memory 316 can be reduced by managing a table such as a memory free table, advancing the free timing of the memory area (area of local decoding that is not referred to) corresponding to the difference area $A_D$, which is an image area not to be read, and lowering the peak of the memory use amount.

4. Modification

Configuration Example of Apparatus

FIG. 22 is a diagram illustrating a configuration example of an electronic device to which the present disclosure is applied.

An electronic device 1001 is a device such as a smartphone, a tablet terminal, a wearable terminal, a digital still camera, a digital video camera, a mobile phone, or a personal computer (PC). In the electronic device 1001, a CPU 1011, a main memory 1012, an input unit 1013, an output unit 1014, a storage unit 1015, a communication unit 1016, an imaging unit 1017, and an image processing unit 1018 are connected by a bus 1019.

The CPU 1011 loads the program recorded in the storage unit 1015 into the main memory 1012 and executes the program to perform control of the operation of each unit and various kinds of processing. The main memory 1012 is a memory such as a random access memory (RAM).

The input unit 1013 includes an operation unit such as a physical button or a touch panel, a microphone, a sensor such as an IMU, and the like. The output unit 1014 includes a display, a speaker, and the like. The storage unit 1015 is an auxiliary storage device such as an external storage such as a memory card or an internal storage such as a hard disk drive (HDD) or a solid state drive (SSD). The communication unit 1016 is a communication module compatible with cellular communication (for example, LTE-Advanced, 5th generation (5G), or the like), wireless communication such as a wireless local area network (LAN), or wired communication.

The imaging unit 1017 includes an image sensor, a signal processing unit, and the like. The imaging unit 1017 images a subject, generates an imaged image, and outputs image data thereof. The image processing unit 1018 performs predetermined image processing on the image data from the imaging unit 1017. That is, the image processing unit 1018 corresponds to at least a part of the image processing apparatus 101 (FIG. 4), the image processing apparatus 201 (FIG. 14), or the image processing apparatus 301 (FIG. 20) described above, and can perform processing related to image stabilization, ROI, or codec. The image processing unit 1018 has a function of freeing a memory area where image data is stored but is not read before read processing is completed when processing related to image stabilization or the like is performed.

Note that the embodiments of the present technology are not limited to the above-described embodiments, and various modifications can be made without departing from the gist of the present technology. For example, the processing illustrated in the above-described flowcharts is not necessarily required to be performed in time series in the described order. Furthermore, the program may be processed by one computer (processor) or may be processed in a distributed manner by a plurality of computers (processors).

Furthermore, the effects described in the present specification are merely examples and are not limited, and other effects may be provided.

Note that the present technology can take the following configuration.

(1)

An image processing apparatus including:

a memory that stores image data; and a control unit that controls write processing of writing the image data in the memory and read processing of reading the image data stored in the memory, in which the control unit frees a memory area where the image data is stored but is not read before the read processing is completed.

(2)

The image processing apparatus according to (1), in which the control unit frees a memory area where the image data is stored but is not read before start of the read processing or in a middle of the read processing.

(3)

The image processing apparatus according to (1) or (2), in which a storage area which is an area of the image data stored in the memory by the write processing and a read area which is an area for reading the image data stored in the memory by the read processing are different, and the control unit frees a memory area corresponding to a difference area that is a difference between the storage area and the read area.

(4)

The image processing apparatus according to any one of (1) to (3), in which the control unit records management information regarding an area of the image data read from the memory by the read processing, and uses the recorded management information as information regarding free timing of a memory area and also as information regarding an area where the image data is stored but is not read.

(5)

The image processing apparatus according to (4), in which the control unit sets a value of initial state of the free timing for each area of the image data in the management information, and overwrites the value of initial state with a predetermined value when an area of the image data is read.

(6)

The image processing apparatus according to (5), in which the control unit overwrites the value of initial state with a number of an output block when an area of the image data is read last.

(7)

The image processing apparatus according to (5) or (6), in which the control unit frees a memory area corresponding to an area for which the value of initial state is set as the free timing among areas of the image data when the read processing is started on the basis of the management information.

(8)

The image processing apparatus according to (4), in which the control unit manages an area of the image data that is not read from the memory with a flag in the management information.

(9)

The image processing apparatus according to (8),
in which the control unit frees a memory area corresponding to an area indicated by the flag among areas of the image data when creation of the management information is completed.

(10)

The image processing apparatus according to any one of (1) to (9),
in which the memory is a frame memory that stores image data of an image frame.

(11)

The image processing apparatus according to any one of (1) to (10),
in which processing related to image stabilization, ROI, or codec is performed.

(12)

An image processing method,
in which, when write processing of writing image data in a memory and read processing of reading the image data stored in the memory are controlled, an image processing apparatus frees a memory area where the image data is stored but is not read before the read processing is completed.

REFERENCE SIGNS LIST

101 Image processing apparatus
110 Memory control unit
111 Write control unit
112 Storage area designation unit
113 Memory area management unit
114 Frame memory
115 Read control unit
116 Read area designation unit
161 IMU
162 DSP
163 Reference area calculation unit
181 MV table
182 Memory free table
201 Image processing apparatus
211 Pixel unit
212 AD unit
213 Pixel drive area control unit
214 Feature extraction unit
215 Storage area designation unit
216 Feature extraction unit
217 Read area designation unit
218 Write control unit
219 Memory area management unit
220 Frame memory
221 Read control unit
261 Imaging unit
262 DNN unit
263 Reference area calculation unit
281 Object area coordinate table
282 Memory free table
301 Image processing apparatus
311 High-resolution motion prediction unit
312 Encoding unit
313 Local decoding unit
314 Write control unit
315 Memory area management unit
316 Frame memory
317 Read control unit
318 Reduced image generation unit
319 Reduced image memory
320 Reduced image search unit
321 Read area designation unit 321
1001 Electronic device
1018 Image processing unit

The invention claimed is:

1. An image processing apparatus, comprising:
a memory configured to store image data, wherein the image data includes:
first image data, and
second image data different from the first image data; and
a control unit configured to:
determine a storage area in the memory;
control a write process to write the image data in the storage area of the memory;
determine a read area in the storage area, wherein the read area stores the first image data;
determine a difference area in the storage area, wherein the difference area stores the second image data, and the difference area is different from the read area;
control a read process to read the first image data stored in the read area; and
free the difference before completion of the read process.

2. The image processing apparatus according to claim 1, wherein the control unit is further configured to free the difference area at least before start of the read process or in a middle of the read process.

3. The image processing apparatus according to claim 1, wherein
the control unit is further configured to record management information regarding the read area, and
the recorded management information includes:
first information regarding free timing of the storage area, and
second information regarding the difference area.

4. The image processing apparatus according to claim 3, wherein the control unit is further configured to:
set, in the management information, a value of an initial state of the free timing of the storage area; and
overwrite the value of the initial state with a specific value after the read process on a specific area, wherein the specific area is in the read area.

5. The image processing apparatus according to claim 4, wherein
the control unit is further configured to overwrite, based on third image data in the specific area, the value of the initial state with a number of an output block of the specific area,
the third image data is read last in the read process, and
the first image data includes the third image data.

6. The image processing apparatus according to claim 4, wherein
the control unit is further configured to free the difference area based on the value of the initial state after start of the read process, and
the read process starts based on the management information.

7. The image processing apparatus according to claim 3, wherein the control unit is further configured to manage the difference area with a flag in the management information.

8. The image processing apparatus according to claim 7, wherein
the control unit is further configured to free the difference area after creation of the management information, and
the difference area is indicated by the flag in the management information.

9. The image processing apparatus according to claim 1, wherein
the memory is a frame memory, and
the memory is further configured to store the image data of an image frame.

10. The image processing apparatus according to claim 9, wherein the image processing apparatus is configured to perform at least one of an image stabilization process, a region of interest (ROI) function, or a codec function.

11. An image processing method, comprising:
in an image processing apparatus:
storing image data in a memory, wherein the image data includes:
first image data, and
second image data different from the first image data;
determining a storage area in the memory;
controlling a write process for writing the image data in the storage area of the memory;
determining a read area in the storage area, wherein the read area stores the first image data;
determining a difference area in the storage area, wherein
the difference area stores the second image data, and
the difference area is different from the read area;
controlling a read process for reading the first image data stored in the read area; and
freeing the difference area before completion of the read process.

* * * * *